(12) United States Patent
Kimes et al.

(10) Patent No.: US 9,435,387 B2
(45) Date of Patent: *Sep. 6, 2016

(54) DEVICE AND APPARATUS FOR CONTROLLING THE OPERATING MODE OF A COUPLING ASSEMBLY, COUPLING AND CONTROL ASSEMBLY AND ELECTRIC MOTOR DISCONNECT AND PASS THROUGH ASSEMBLIES

(71) Applicant: Means Industries, Inc., Saginaw, MI (US)

(72) Inventors: John W. Kimes, Wayne, MI (US); Patrick J. McCleer, Jackson, MI (US); Terry O. Hendrick, Cass City, MI (US)

(73) Assignee: Means Industries, Inc., Saginaw, MI (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/487,234

(22) Filed: Sep. 16, 2014

(65) Prior Publication Data

US 2015/0014116 A1 Jan. 15, 2015

Related U.S. Application Data

(63) Continuation-in-part of application No. 13/370,507, filed on Feb. 10, 2012, which is a continuation-in-part of application No. 13/218,817, filed on Aug. 26, 2011, now Pat. No. 8,888,637, which is a (Continued)

(51) Int. Cl.
*F16D 41/16* (2006.01)
*F16D 27/108* (2006.01)
*F16D 41/12* (2006.01)

(52) U.S. Cl.
CPC ............ *F16D 41/16* (2013.01); *F16D 27/108* (2013.01); *F16D 41/125* (2013.01)

(58) Field of Classification Search
CPC ............................ F16D 41/06; F16D 27/108
See application file for complete search history.

(56) References Cited

U.S. PATENT DOCUMENTS 2,863,326 A 12/1958 Maurice et al.
2,866,109 A 12/1958 Watson (Continued)

FOREIGN PATENT DOCUMENTS

GB 1007475 A 10/1965
JP 09196128 7/1997

OTHER PUBLICATIONS

International Search Report and Written Opinion, International application No. PCT/US2011/036636; mailed Aug. 26, 2011.

(Continued)

*Primary Examiner* — Richard Lorence
(74) *Attorney, Agent, or Firm* — Brooks Kushman P.C.

(57) ABSTRACT

Device and apparatus for controlling the operating mode of a coupling assembly, coupling and control assembly and electric motor disconnect and pass through assemblies are provided. The device is a switchable linear actuator device to control the operating mode of a coupling assembly. A plurality of magnetic sources produce corresponding magnetic fields to create a net translational force. A stator structure includes at least one electromagnetic source and a translator structure includes a permanent magnet source magnetically coupled to the stator structure across a radial air gap. The translator structure is supported for translational movement relative to the stator structure along an axis between first and second stable axial end positions which correspond to first and second operating modes of the coupling assembly and an unstable axial equilibrium position between the end positions. The translator structure translates along the axis between the different positions upon experiencing the net translational force.

34 Claims, 15 Drawing Sheets

Related U.S. Application Data continuation-in-part of application No. PCT/US2011/036636, filed on May 16, 2011.

(60) Provisional application No. 61/421,868, filed on Dec. 10, 2010, provisional application No. 61/882,694, filed on Sep. 26, 2013.

(56) References Cited

U.S. PATENT DOCUMENTS

| | | |
|---|---|---|
| 2,947,537 A | 8/1960 | Littell et al. |
| 2,959,062 A | 11/1960 | Looker |
| 2,960,287 A | 11/1960 | Barlow |
| 2,966,975 A | 1/1961 | Wiedmann et al. |
| 2,969,134 A | 1/1961 | Wiedmann et al. |
| 3,130,989 A | 4/1964 | Lannen |
| 3,199,645 A * | 8/1965 | Henning ............ F16D 27/004 188/164 |
| 4,050,560 A | 9/1977 | Torstenfelt |
| 4,340,133 A | 7/1982 | Blersch |
| 4,651,847 A | 3/1987 | Hermanns |
| 5,046,594 A | 9/1991 | Kakinuma |
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,342,258 A | 8/1994 | Egyed |
| 5,362,293 A | 11/1994 | Romanauskas |
| 5,387,854 A | 2/1995 | McCleer et al. |
| 5,394,321 A | 2/1995 | McCleer et al. |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,827,148 A * | 10/1998 | Seto et al. ........ B60W 30/1819 477/15 |
| 5,846,257 A | 12/1998 | Hood |
| 5,847,469 A | 12/1998 | Tabata et al. |
| 5,856,709 A | 1/1999 | Ibaraki et al. |
| 5,918,715 A | 7/1999 | Ruth et al. |
| 5,924,510 A | 7/1999 | Itoh et al. |
| 5,927,455 A | 7/1999 | Baker et al. |
| 6,019,699 A | 2/2000 | Hoshiya et al. |
| 6,065,576 A | 5/2000 | Shaw et al. |
| 6,075,302 A | 6/2000 | McCleer |
| 6,193,038 B1 | 2/2001 | Scott et al. |
| 6,237,931 B1 | 5/2001 | Marola |
| 6,244,965 B1 | 6/2001 | Klecker et al. |
| 6,290,044 B1 | 9/2001 | Burgman et al. |
| 6,306,057 B1 | 10/2001 | Morisawa et al. |
| 6,328,670 B1 | 12/2001 | Minowa et al. |
| 6,344,008 B1 | 2/2002 | Nagano et al. |
| 6,503,167 B1 | 1/2003 | Sturm |
| 6,692,405 B2 | 2/2004 | Minowa et al. |
| 6,814,201 B2 | 11/2004 | Thomas |
| 6,827,167 B2 | 12/2004 | Cikanek et al. |
| 6,846,257 B2 | 1/2005 | Baker et al. |
| 6,905,009 B2 | 6/2005 | Reed et al. |
| 6,953,409 B2 | 10/2005 | Schmidt et al. |
| 6,982,502 B1 | 1/2006 | Sendaula et al. |
| 7,093,512 B2 | 8/2006 | Ibamoto et al. |
| 7,153,228 B2 | 12/2006 | Fujiu et al. |
| 7,198,587 B2 | 4/2007 | Samie et al. |
| 7,201,690 B2 | 4/2007 | Miura et al. |
| 7,223,198 B2 | 5/2007 | Kimes et al. |
| 7,223,200 B2 | 5/2007 | Kojima et al. |
| 7,255,186 B2 | 8/2007 | Wakuta et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryant et al. |
| 7,393,296 B2 | 7/2008 | Kano et al. |
| 7,397,296 B1 | 7/2008 | Kiani |
| 7,426,971 B2 | 9/2008 | Kano et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,614,466 B2 | 11/2009 | Kano et al. |
| 7,621,359 B2 | 11/2009 | Kano et al. |
| 7,690,455 B2 | 4/2010 | Kano et al. |
| 7,695,387 B2 | 4/2010 | Oba |
| 7,743,678 B2 | 6/2010 | Wittkopp et al. |
| 7,806,795 B2 | 10/2010 | Oba et al. |
| 7,898,121 B2 | 3/2011 | Ramsay et al. |
| 7,942,781 B2 | 5/2011 | Kimes |
| 7,992,695 B2 | 8/2011 | Wittkopp et al. |
| 8,051,959 B2 | 11/2011 | Eisengruber |
| 8,061,496 B2 | 11/2011 | Samie et al. |
| 8,079,453 B2 | 12/2011 | Kimes |
| 8,286,772 B2 | 10/2012 | Eisengruber |
| 8,443,956 B2 | 5/2013 | Bauer et al. |
| 2001/0049306 A1 | 12/2001 | Tanaka |
| 2004/0110594 A1 | 6/2004 | Goto |
| 2004/0159517 A1 | 8/2004 | Thomas |
| 2004/0238306 A1 | 12/2004 | Reed et al. |
| 2006/0138777 A1 | 6/2006 | Hofbauer et al. |
| 2006/0185957 A1 | 8/2006 | Kimes et al. |
| 2006/0252589 A1 | 11/2006 | Tay |
| 2006/0278487 A1 | 12/2006 | Pawley et al. |
| 2007/0034470 A1 | 2/2007 | Fetting, Jr. et al. |
| 2007/0056825 A1 | 3/2007 | Fetting, Jr. et al. |
| 2007/0107960 A1 | 5/2007 | Takami et al. |
| 2007/0278061 A1 | 12/2007 | Wittkopp et al. |
| 2008/0093190 A1 | 4/2008 | Belmont |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2008/0245360 A1 | 10/2008 | Almy et al. |
| 2008/0277891 A1 | 11/2008 | Adams, III et al. |
| 2009/0084653 A1 | 4/2009 | Holmes |
| 2009/0098968 A1 | 4/2009 | Maguire et al. |
| 2009/0098970 A1 | 4/2009 | Kimes |
| 2009/0127059 A1 | 5/2009 | Knoblauch |
| 2009/0133981 A1 | 5/2009 | Tarasinski et al. |
| 2009/0142207 A1 | 6/2009 | Ring et al. |
| 2009/0159391 A1 | 6/2009 | Eisengruber |
| 2009/0194381 A1 | 8/2009 | Samie et al. |
| 2009/0211863 A1 | 8/2009 | Kimes |
| 2009/0255773 A1 | 10/2009 | Seufert et al. |
| 2010/0044141 A1 | 2/2010 | Kimes et al. |
| 2010/0071497 A1 | 3/2010 | Reisch et al. |
| 2010/0119389 A1 | 5/2010 | Lazebnik et al. |
| 2010/0200358 A1 | 8/2010 | Eisengruber et al. |
| 2010/0230226 A1 | 9/2010 | Prout |
| 2010/0252384 A1 | 10/2010 | Eisengruber |
| 2011/0011694 A1 | 1/2011 | Swales et al. |
| 2011/0140451 A1 | 6/2011 | Sharples et al. |
| 2011/0177900 A1 | 7/2011 | Simon |
| 2011/0183806 A1 | 7/2011 | Wittkopp et al. |
| 2011/0192697 A1 | 8/2011 | Prout et al. |
| 2011/0215575 A1 | 9/2011 | Hofbauer et al. |
| 2011/0233026 A1 | 9/2011 | Pawley |
| 2012/0145505 A1 | 6/2012 | Kimes |
| 2012/0145506 A1 | 6/2012 | Samie et al. |
| 2012/0152683 A1 | 6/2012 | Kimes |
| 2012/0152687 A1 | 6/2012 | Kimes et al. |
| 2014/0102844 A1 | 4/2014 | Greene et al. |
| 2014/0190785 A1 | 7/2014 | Fetting et al. |
| 2014/0284167 A1 | 9/2014 | Kimes |
| 2015/0000442 A1* | 1/2015 | Kimes et al. ......... F16D 23/02 74/335 |

OTHER PUBLICATIONS

International Search Report and Written Opinion, International application No. PCT/US2011/036634; mailed Aug. 25, 2011.

International Search Report and Written Opinion, International application No. PCT/US2012/025046; date of mailing May 21, 2012.

International Search Report and Written Opinion, International application No. PCT/US2012/050742; date of mailing Nov. 20, 2012.

(56) References Cited

OTHER PUBLICATIONS

International Search Report and Written Opinion, International application No. PCT/US2012/50749; date of mailing Dec. 11, 2012.
International Preliminary Report on Patentability; International application No. PCT/US2012/025046; date of issuance of report Aug. 21, 2013.
International Preliminary Report on Patentability; International application No. PCT/US2012/050749; date of issuance of report Mar. 4, 2014.
International Preliminary Report on Patentability; International application No. PCT/US2012/050742; date of issuance of report Mar. 4, 2014.
International Preliminary Report on Patentability; International application No. PCT/US2012/050753; date of issuance of report Mar. 25, 2014.
Office Action; U.S. Appl. No. 13/370,507; date of mailing Aug. 27, 2014.
International Search Report and Written Opinion; related international application No. PCT/US2014/057140; date of mailing Feb. 26, 2015.
International Search Report and Written Opinion; related international application No. PCT/US2014/056716; date of mailing Mar. 3, 2015.
Notice of Allowance and Fee(s) Due; related U.S. Appl. No. 13/370,507; date mailed Dec. 18, 2015.
International Search Report and Written Opinion; International application No. PCT/US14/56749; date of mailing Dec. 24, 2014.
International Preliminary Report on Patentability; related International application No. PCT/US2014/056716; date of issuance of report Mar. 29, 2016.
International Preliminary Report on Patentability; related International application No. PCT/US2014/056749; date of issuance of report Mar. 29, 2016.
International Preliminary Report on Patentability; related International application No. PCT/US2014/057140; date of issuance of report Mar. 29, 2016.
International Search Report and Written Opinion; related International application No. PCT/US2016/013836; date of mailing Mar. 30, 2016.
Office Action; related U.S. Appl. No. 14/882,505; notification date May 19, 2016.
Notice of Rejection; English Summary; related Japanese application No. 2013-553658; draft date Dec. 24, 2015.
Office Action; related U.S. Appl. No. 14/488,673; notification date Feb. 3, 2016.
Notice of Allowance and Fee(s) Due; related U.S. Appl. No. 14/488,673; date mailed May 17, 2016.

* cited by examiner

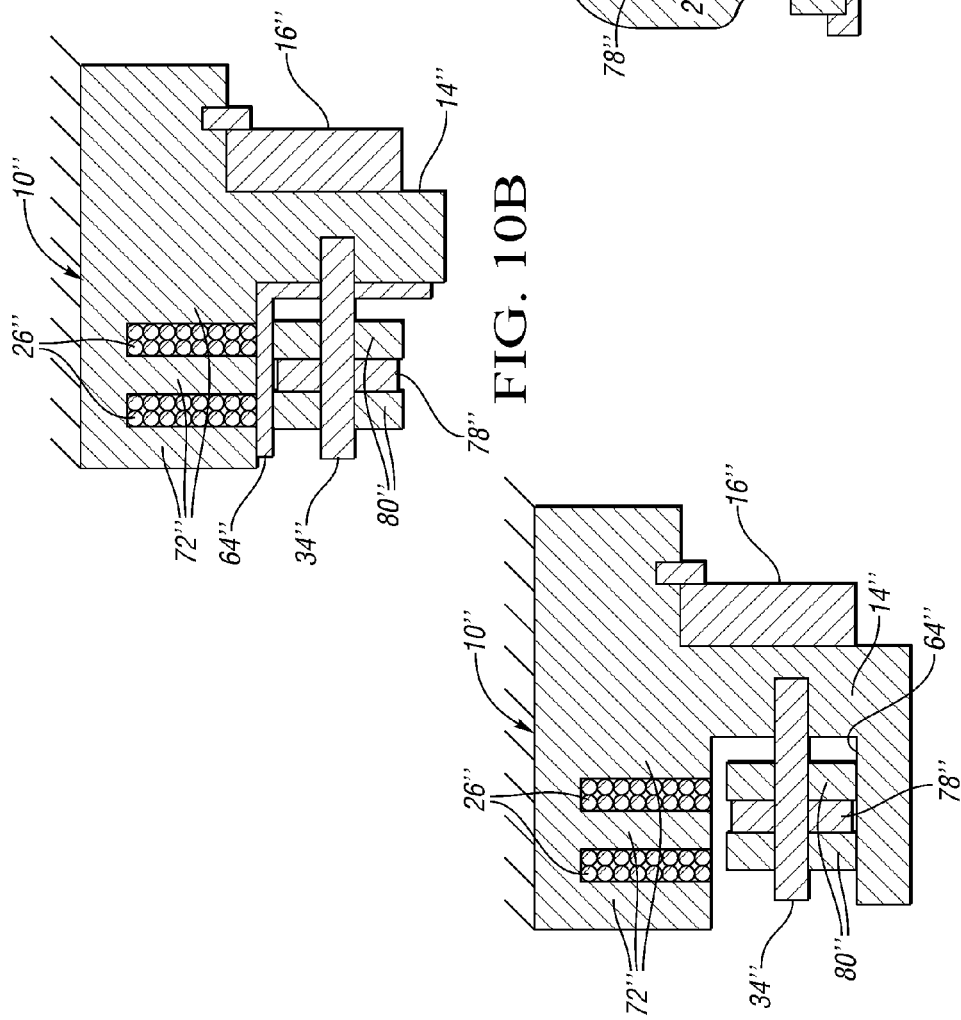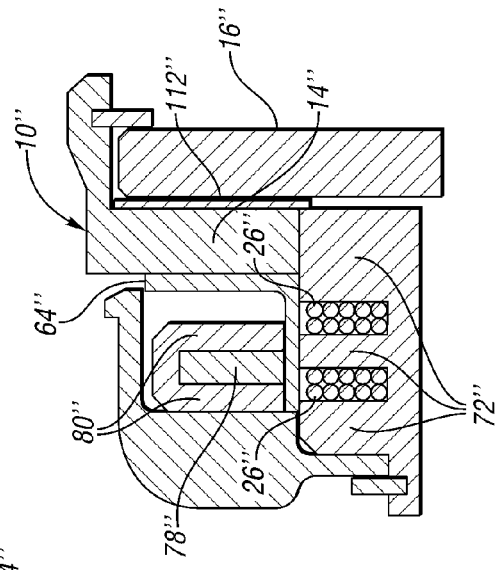

DEVICE AND APPARATUS FOR CONTROLLING THE OPERATING MODE OF A COUPLING ASSEMBLY, COUPLING AND CONTROL ASSEMBLY AND ELECTRIC MOTOR DISCONNECT AND PASS THROUGH ASSEMBLIES

CROSS-REFERENCE TO RELATED APPLICATIONS

This application is a continuation-in-part application of U.S. patent application Ser. No. 13/370,507 filed Feb. 10, 2012. That application is a continuation-in-part of U.S. patent application Ser. No. 13/218,817 filed Aug. 26, 2011 which, in turn, is a continuation-in-part of U.S. national phase of PCT Application No. PCT/US11/36636 filed May 16, 2011 which claims the benefit of U.S. provisional patent application No. 61/421,868 filed Dec. 10, 2010. This application also claims the benefit of U.S. provisional patent application Ser. No. 61/882,694 filed Sep. 26, 2013.

TECHNICAL FIELD

This invention relates to devices and apparatus to control the operating mode of coupling apparatus such as controllable one-way clutches (OWCs), coupling and control assemblies and electric motor disconnect and pass through assemblies.

OVERVIEW

A typical one-way clutch (OWC) consists of an inner ring, an outer ring and a locking device between the two rings. The one-way clutch is designed to lock in one direction and to allow free rotation in the other direction. Two types of one-way clutches often used in vehicular, automatic transmissions include:
  Roller type which consists of spring loaded rollers between the inner and outer race of the one-way clutch. (Roller type is also used without springs on some applications); and
  Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2011/0140451; 2011/0215575; 2011/0233026; 2011/0177900; 2010/0044141; 2010/0071497; 2010/0119389; 2010/0252384; 2009/0133981; 2009/0127059; 2009/0084653; 2009/0194381; 2009/0142207; 2009/0255773; 2009/0098968; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/0138777; 2006/0185957; 2004/0110594; and the following U.S. Pat. Nos. 7,942,781; 7,806,795; 7,690,455; 7,491,151; 7,484,605; 7,464,801; 7,349,010; 7,275,628; 7,256,510; 7,223,198; 7,198,587; 7,093,512; 6,953,409; 6,846,257; 6,814,201; 6,503,167; 6,193,038; 4,050,560; 4,340,133; 5,597,057; 5,918,715; 5,638,929; 5,362,293; 5,678,668; 5,070,978; 5,052,534; 5,387,854; 5,231,265; 5,394,321; 5,206,573; 5,453,598; 5,642,009; 6,075,302; 6,065,576; 6,982,502; 7,153,228; 5,924,510; and 5,918,715.

A linear motor is an electric motor that has had its stator and rotor "unrolled" so that instead of producing a torque (rotation) it produces a linear force along its length. The most common mode of operation is as a Lorentz-type actuator, in which the applied force is linearly proportional to the current and the magnetic field. U.S. published application 2003/0102196 discloses a bi-directional linear motor.

Mechanical forces that are due to local or distant magnetic sources, i.e. electric currents and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of force production across air gaps in a magnetic machine structure.

One can generally determine the direction of net force production in portions of a magnetic machine by examining plots of magnetic field lines within the structure. The more field lines (i.e. the more stretched rubber bands) in any one direction across an air gap separating machine elements, the more "pulling" force between machine elements in that given direction.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

A clevis fastener is a three piece fastener system consisting of a clevis, clevis pin, and tang. The clevis is a U-shaped piece that has holes at the end of the prongs to accept the clevis pin. The clevis pin is similar to a bolt, but is only partially threaded or unthreaded with a cross-hole for a cotter pin. The tang is the piece that fits between the clevis and is held in place by the clevis pin. The combination of a simple clevis fitted with a pin is commonly called a shackle, although a clevis and pin is only one of the many forms a shackle may take.

Clevises are used in a wide variety of fasteners used in the farming equipment, sailboat rigging, as well as the automotive, aircraft and construction industries. They are also widely used to attach control surfaces and other accessories to servos in model aircraft. As a part of a fastener, a clevis provides a method of allowing rotation in some axes while restricting rotation in others.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF EXAMPLE EMBODIMENTS

In one embodiment, a switchable linear, actuator device to control the operating mode of a coupling assembly is provided. The device has a plurality of magnetic sources which produce corresponding magnetic fields to create a net translational force. The device includes a stator structure having at least one electromagnetic source and a translator structure including a permanent magnet source magnetically coupled to the stator structure across a radial air gap. The translation structure is supported for translational movement relative to the stator structure along an axis between first and second stable axial end positions which correspond to first and second operating modes of the coupling assembly and an unstable axial equilibrium position between the end positions. The translator structure translates along the axis between the different positions upon experiencing the net translational force comprising a first translational force caused by energization of the at least one electromagnetic source and a latching force based upon linear position of the permanent magnet source along the axis.

The structures may be substantially circularly symmetric.

The permanent magnet source may comprise an annular magnet.

The annular magnetic may be a rare earth magnet.

The annular magnet may be axially magnetized.

The translator structure may include a pair of field redirection rings wherein the annular magnet is sandwiched between the field redirection rings. Each electromagnetic source may include an annular slot and a coil disposed in the slot. Each slot may open to the radial air gap.

In another embodiment, a reciprocating electromechanical apparatus for controlling the operating mode of a coupling assembly is provided. The apparatus includes first and second members having first and second faces, respectively, in close-spaced opposition with one another. The second member is mounted for rotation about an axis and for reciprocating movement along the axis. The apparatus also includes magnetic circuit components having first and second magnetic sources. The first magnetic source is supported by the first member at the first face in close-spaced opposition to the second magnetic source which is supported by the second member. The magnetic sources are separated by a radial air gap. The second magnetic source is a permanent magnet source having a permanent magnetic field and the first magnetic source is an electromagnetic source including a coil. The apparatus further includes a connecting rod extending from the second member to connect the second member to a locking element of the coupling assembly to transfer the reciprocating movement to the locking element. Coil energization creates a temporary magnetic field which causes the second member and the connecting rod to reciprocate between extended and retracted positions along the axis. The permanent magnetic field causes the second member and the connecting rod to maintain at least one of the positions without the need to maintain coil energization thereby providing a latching effect.

The first face may have at least one recess in which the coil is located.

The at least one recess may include an annular recess. The permanent magnet source may be an annular magnet.

In yet another embodiment, an overrunning coupling and control assembly is provided. The assembly includes first and second coupling members supported for rotation relative to one another about a common rotational axis, and at least one locking member for selectively mechanically coupling the members together to prevent relative rotation of the first and second coupling members with respect to each other in at least one direction about the axis. The assembly also includes a stator subassembly including at least one coil to create a magnetic flux when the at least one coil is energized and a magnetically-latching actuator subassembly including at least one bi-directionally movable rod. Each rod is being coupled to its respective locking member for selective, small-displacement locking member movement. The actuator subassembly further includes a magnetic actuator coupled to each rod and mounted for controlled reciprocating movement along the rotational axis relative to the first coupling member between an extended position which corresponds to a first mode of the assembly and a retracted position which corresponds to a second mode of the assembly. Each rod actuates its respective locking member in the extended position so that each locking member couples the first and second coupling members for rotation with each other in at least one direction about the rotational axis. The magnetic actuator completes a path of the magnetic flux to magnetically latch in at least one of the positions. A control force caused by the magnetic flux is applied to linearly move the magnetic actuator between the retracted and extended positions along the rotational axis.

The magnetic actuator may include a permanent magnet source.

The assembly may further include a guide member to guide the reciprocating movement.

Each of the rods may be plunger-shaped.

The assembly may further include at least one bearing for rotatably supporting the first coupling member on the stator subassembly.

The first coupling member and the stator subassembly may form a unitary structure wherein a radial air gap separates the unitary structure from the actuator subassembly.

Each locking member may be a locking strut. The guide member may include a support portion to support the actuator subassembly adjacent the stator subassembly.

A portion of the first coupling member may support the actuator subassembly adjacent the stator subassembly.

The first coupling member may be a pocket plate.

In still another embodiment, an overrunning clutch and control assembly is provided. The assembly includes first and second clutch members supported for rotation relative to one another about a common rotational axis, and at least one locking strut for selectively mechanically coupling the members together to prevent relative rotation of the first and second clutch members with respect to each other in at least one direction about the axis. The assembly further includes a stator subassembly including at least one coil to create a magnetic flux when the at least one coil is energized and a magnetically-latching actuator subassembly including at least one bi-directionally movable rod. Each rod is coupled to its respective locking strut for selective, small displacement strut movement. The actuator subassembly further includes a magnetic actuator device coupled to each rod and mounted for controlled reciprocating movement along the rotational axis relative to the first clutch member between an extended position which corresponds to a first mode of the assembly and a retracted position which corresponds to a second mode of the assembly. Each rod actuates its respective locking strut so that each locking strut couples the first and second clutch members for rotation with each other in at least one direction about the rotational axis. The magnetic actuator device completes a path of the magnetic flux to magnetically latch in at least one of the positions. A control force caused by the magnetic flux is applied to linearly move the magnetic actuator device between the retracted and extended positions along the rotational axis.

The magnetic actuator device may include a permanent magnet source.

The assembly may further include a guide member to guide the reciprocating movement.

Each of the rods may be plunger-shaped. The assembly may further include at least one bearing for rotatably supporting the first clutch member on the stator subassembly.

The first clutch member and the stator subassembly may form a unitary structure wherein a radial air gap separates the unitary structure from the actuator subassembly.

The guide member may include a support portion to support the actuator subassembly adjacent the stator subassembly.

A portion of the first clutch member may support the actuator subassembly adjacent the stator subassembly.

The first clutch member may be a pocket plate. The clutch may be a dynamic clutch or a static clutch.

In yet another embodiment, an electric motor disconnect assembly is provided. The assembly includes a motor stator, a motor rotor, a rotary output shaft and an overrunning coupling and control subassembly. The subassembly includes first and second coupling members supported for rotation relative to one another about a common rotational axis, and at least one locking member for selectively mechanically coupling the members together to prevent relative rotation of the first and second coupling members with respect to each other in at least one direction about the axis. The second coupling member is coupled to the rotary output shaft. The subassembly also includes a stator subassembly including at least one coil to create a magnetic flux when the at least one coil is energized and a magnetically-latching actuator subassembly including at least one bi-directionally movable rod. Each rod is coupled to its respective locking member for selective, small displacement locking member movement. The actuator subassembly also includes a magnetic actuator device coupled to each rod and mounted for controlled shifting movement along the rotational axis relative to the first coupling member between an extended position which corresponds to a first mode of the assembly and a retracted position which corresponds to a second mode of the assembly. Each rod actuates its respective locking member in the extended position so that each locking member couples the first and second coupling members for rotation with each other in at least one direction about the rotational axis. The magnetic actuator device completes a path of the magnetic flux to magnetically latch in at least one of the positions. A control force caused by the magnetic flux is applied to linearly move the magnetic actuator device between the retracted and extended positions along the rotational axis.

In yet another embodiment, an electric motor disconnect and pass through assembly is provided. The assembly includes a motor stator, a motor rotor, a rotary input shaft, a rotary output shaft and a pair of overrunning coupling and control subassemblies. Each of the subassemblies includes first and second coupling members supported for rotation relative to one another about a common rotational axis, and at least one locking member for selectively mechanically coupling the members together to prevent relative rotation of the first and second coupling members with respect to each other in at least one direction about the axis. The subassembly also includes a stator subassembly including at least one coil to create a magnetic flux when the at least one coil is energized and a magnetically-latching actuator subassembly including at least one bi-directionally movable rod. Each rod is coupled to its respective locking member for selective, small displacement locking member movement. The actuator subassembly further includes a magnetic actuator device coupled to each rod and mounted for controlled shifting movement along the rotational axis relative to the first coupling member between an extended position which corresponds to a first mode of the assembly and a retracted position which corresponds to a second mode of the assembly. Each rod actuates its respective locking member in an extended position so that each locking member couples the first and second coupling members for rotation with each other in at least one direction about the rotational axis. The magnetic actuator device completes a path of the magnetic flux to magnetically latch in at least one of the positions. A control force caused by the magnetic flux is applied to linearly move the magnetic actuator device between the retracted and extended positions along the rotational axis. One of the second coupling members is coupled to the rotary input shaft and the other of the second coupling members is coupled to the rotary output shaft.

BRIEF DESCRIPTION OF THE DRAWINGS

FIGS. 10A, 10B and 10C are schematic sectional views illustrating various static linear motor concepts constructed in accordance with at least one embodiment of the present invention;

DESCRIPTION OF EXAMPLE EMBODIMENTS

Figure 1:
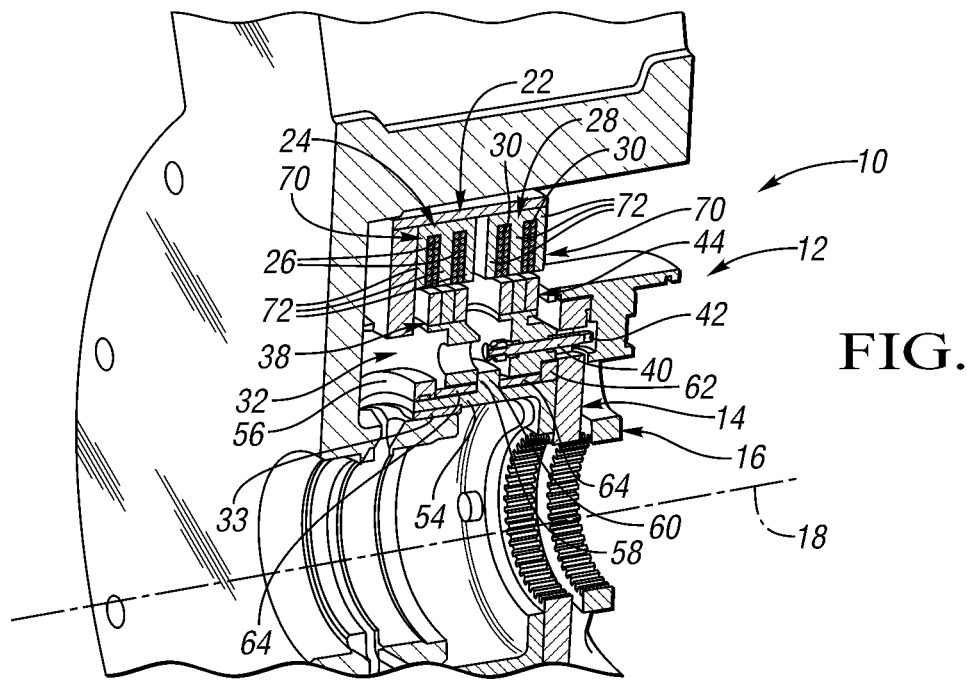
FIG. 1 is a perspective view, partially broken away and in cross-section, of an electromechanical assembly including a reciprocating rod and a first subassembly of a controllable coupling assembly wherein the reciprocating rod of the electromechanical assembly controls the operating mode of the coupling assembly.
Figure 2:
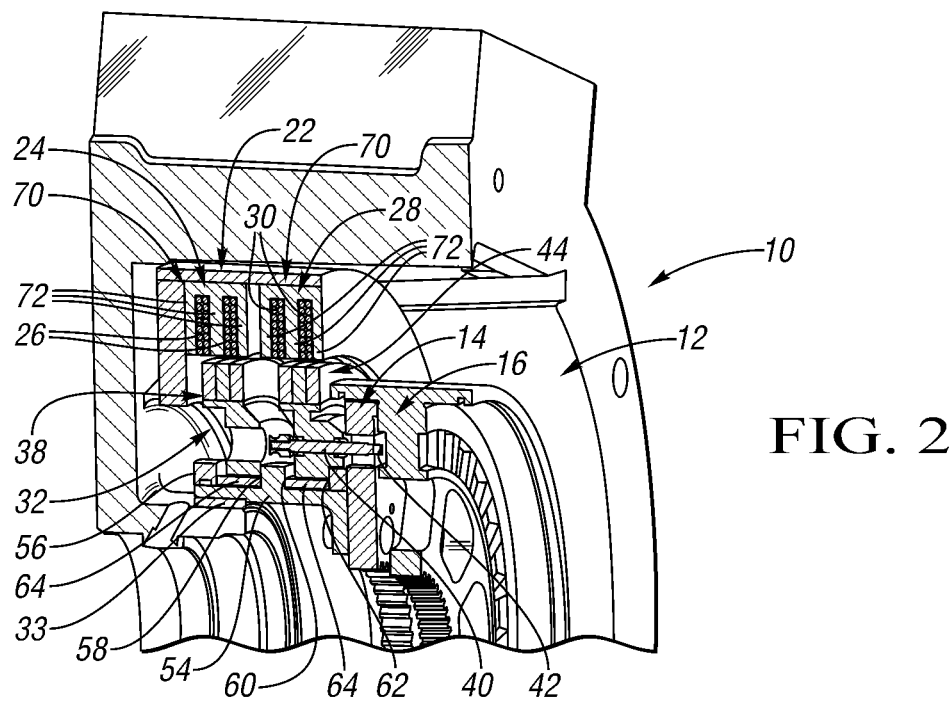
FIG. 2 is a different perspective view, partially broken away and in cross-section, of the assemblies of FIG. 1.
Figure 3:
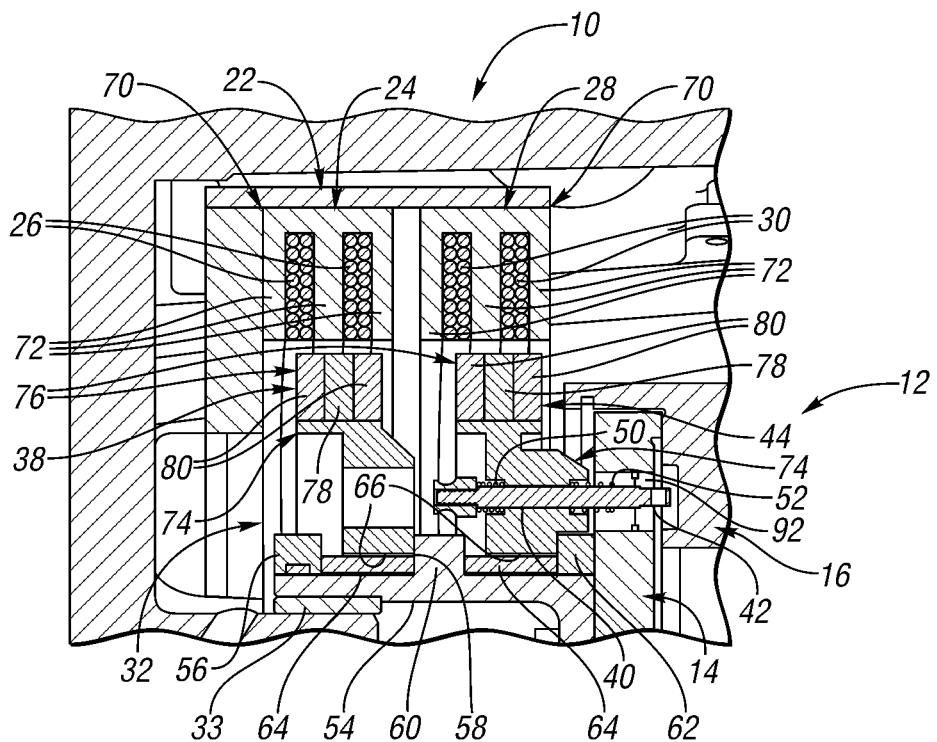
FIG. 3 is an enlarged front view, partially broken away and in cross-section, of the assemblies of FIGS. 1 and 2.
Figure 4:
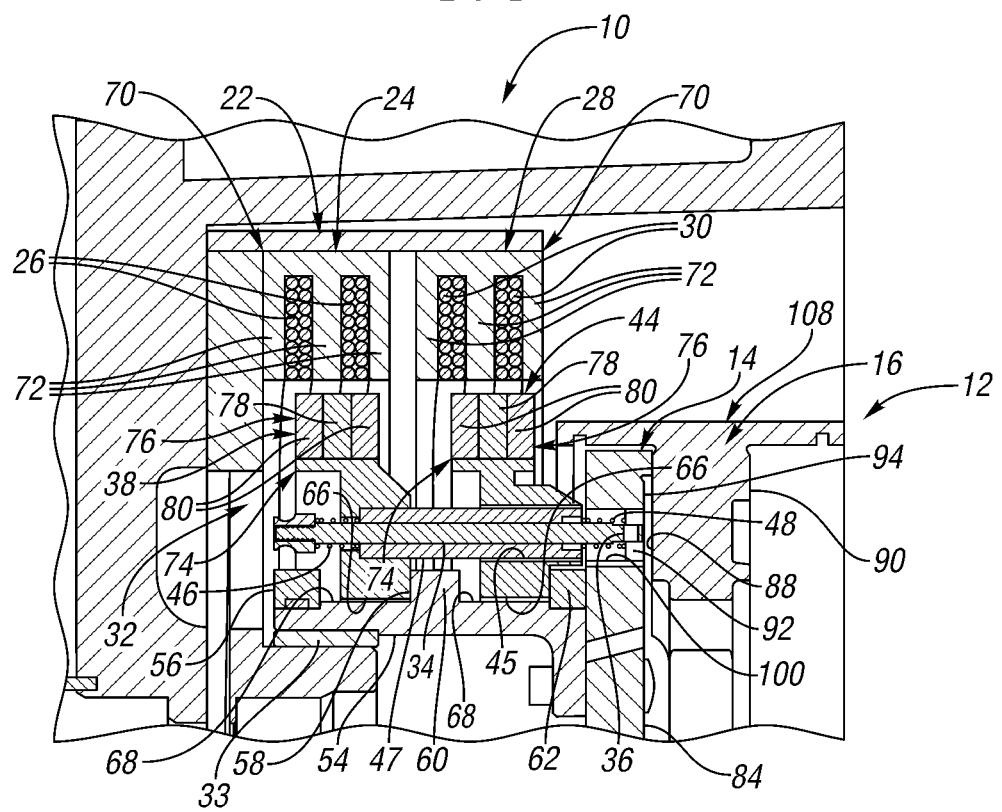
FIG. 4 is an enlarged front view, partially broken away and in cross-section, of the assemblies of FIGS. 1 and 2 but showing a second reciprocating rod to control the operating mode of the coupling assembly.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1-4, there is illustrated an electromechanical assembly, generally indicated at 10, to control the operating mode of a coupling apparatus, generally indicated at 12, having drive and driven members 14 and 16, respectively, supported for rotation relative to one another about a common rotational axis 18. The drive member 14 may be a pocket plate and the driven member 16 may be a notch plate. The coupling apparatus or assembly 12 includes at least one (preferably two) forward strut 20 and at least one (preferably two) reverse strut 20 for selectively mechanically coupling the members 14 and 16 together and change the operating mode of the assembly 12. Preferably, the struts 20 are spaced at 90° intervals about the axis 18.

The assembly 10 includes a first subassembly 22 including a first stator 24 having at least one (preferably two) electromagnetically inductive first coil 26 to create a first magnetic flux when at least one first coil 26 is energized. The subassembly 22 may also include a second stator 28 having at least one (preferably two) electromagnetically inductive second coil 30 to create a second magnetic flux when the at least one second coil 30 is energized.

The assembly 10 also includes a second subassembly 32 adapted for coupling with one of the members 14 or 16 (preferably the member 14) of the coupling apparatus 12 to rotate therewith. The second subassembly 32 is supported for rotation relative to the first subassembly 22 by a bushing 33 about the rotational axis 18 when coupled to the coupling apparatus 12. The second subassembly 32 includes at least one (preferably two) bi-directionally movable first rod 34. Each first rod 34 has a free end 36 adapted for connection to a forward strut 20 of the coupling apparatus 12 for selective, small displacement forward strut movement.

The second subassembly 32 also includes a first actuator 38 operatively connected to the at least one first rod 34 for selective bi-directional shifting movement along the rotational axis 18 between a first position of the first actuator 38 which corresponds to a first mode of the coupling apparatus 12 and a second position of the first actuator 38 which corresponds to a second mode of the coupling apparatus 12. When two first rods 34 are provided, the first rods are spaced 180° apart from one another. The first and second modes may be locked and unlocked (i.e. free wheeling) modes.

A first magnetic control force is applied to the first actuator 38 when the at least one first coil 26 is energized to cause the first actuator 38 to move between its first and second positions along the rotational axis 18.

The second subassembly 32 further includes at least one (preferably two) bi-directionally movable second rod 40. Each second rod 40 has a free end 42 adapted for connection to a reverse strut 20 of the coupling apparatus 12 for selective, small displacement reverse strut movement. The second subassembly 32 also includes a second actuator 44 operatively connected with the at least one second rod 40 for bi-directional shifting movement thereof along the rotational axis 18 between a first position of the second actuator 44 which corresponds to a third mode of the coupling apparatus 12 and a second position of the second actuator 44 which corresponds to a fourth mode of the coupling apparatus 12. When two second rods 40 are provided, the second rods are spaced 180° apart from each other but 90° apart from the first rods 34. The third and fourth modes may be locked and unlocked (i.e. free wheeling) modes.

A second control magnetic force is applied to the second actuator 44 when the at least one second coil 30 is energized to cause the second actuator 44 to move between its first and second positions along the rotational axis 18.

The second subassembly 32 includes a first pair of spaced biasing springs or members 46 and 48 for exerting corresponding biasing forces on the first actuator 38 in opposite directions along the rotational axis 18 when the first actuator 38 moves between its first and second positions along the rotational axis 18. Each face of each actuator 38 or 44 has clearance holes and spring pockets for the connecting rods 34 and 40, respectively, and their respective springs. When the actuators 38 and 44 move they push/pull their respective springs trapped between their faces and the ends of their corresponding rods 34 and 40.

The second subassembly 32 also includes a second pair of spaced biasing springs or members 50 and 52 for exerting corresponding biasing forces on the second actuator 44 in opposite directions along the rotational axis 18 when the second actuator 44 moves between its first and second positions along the rotational axis 18. Axial movement of the actuators 38 and 44 puts a biasing load onto the struts 20 via the springs 46, 48, 50 and 52 to either engage or disengage the struts 20. By reversing the current direction in the stators 24 and 28 their corresponding actuator 38 or 44 is moved back and forth from "off" to "on."

The second subassembly 32 includes a hub 54 adapted for coupling with the one of the members 14 and 16 (preferably the member 14) of the coupling apparatus 12. The hub 54 is supported for rotation relative to the first subassembly 22 by the bushing 33 about the rotational axis 18. The hub 54 slidably supports the first and second actuators 38 and 44, respectively, during corresponding shifting movement along the rotational axis 18.

The second subassembly 32 includes a first pair of spaced stops 56 and 58 supported on the hub 54 to define the first and second positions of the first actuator 38. The second subassembly 32 also includes a second pair of spaced stops 60 and 62 supported on the hub 54 to define the first and second positions of the second actuator 44.

The second subassembly 32 also includes a set of spaced guide pins 64 sandwiched between inner surfaces 66 of the first and second actuators 38 and 44, respectively, and an outer surface 68 of the hub 54 and extending along the rotational axis 18. The inner surfaces 66 and the outer surface 68 have V-shaped grooves or notches formed therein to hold the guide pins 64. The actuators 38 and 44 slide on the guide pins 64 during shifting movement of the actuators 38 and 44 along the rotational axis 18. The guide pins 64 pilot the actuators 38 and 44 on the hub 54. The hub 54 also distributes oil to the guide pins 64.

Each of the stators 24 and 28 includes a ferromagnetic housing 70 having spaced apart fingers 72 and an electromagnetically inductive coil 26 or 30 housed between adjacent fingers 72.

Each of the actuators 38 and 44 includes an annular inner part 74 and an annular outer part 76 connected thereto and having a magnetic annular ring 78 sandwiched between a pair of ferromagnetic backing rings 80. The magnetic control forces magnetically bias the fingers 72 and their corresponding backing rings 80 into alignment upon coil energization. These forces latch their respective actuator 38 or 40 in the "on" and "off" positions. The rings 78 and 80 are acted upon by their respective stators 24 and 28 to move their respective actuators 38 and 40.

The second actuator 44 has at least one (preferably two) aperture 45 extending completely therethrough to allow each first rod 34 to move bi-directionally therethrough. A hollow cylindrical bushing 47 slidably supports each first rod 34 in the at least one aperture 45 during bi-directional shifting movement thereof.

Figure 5:
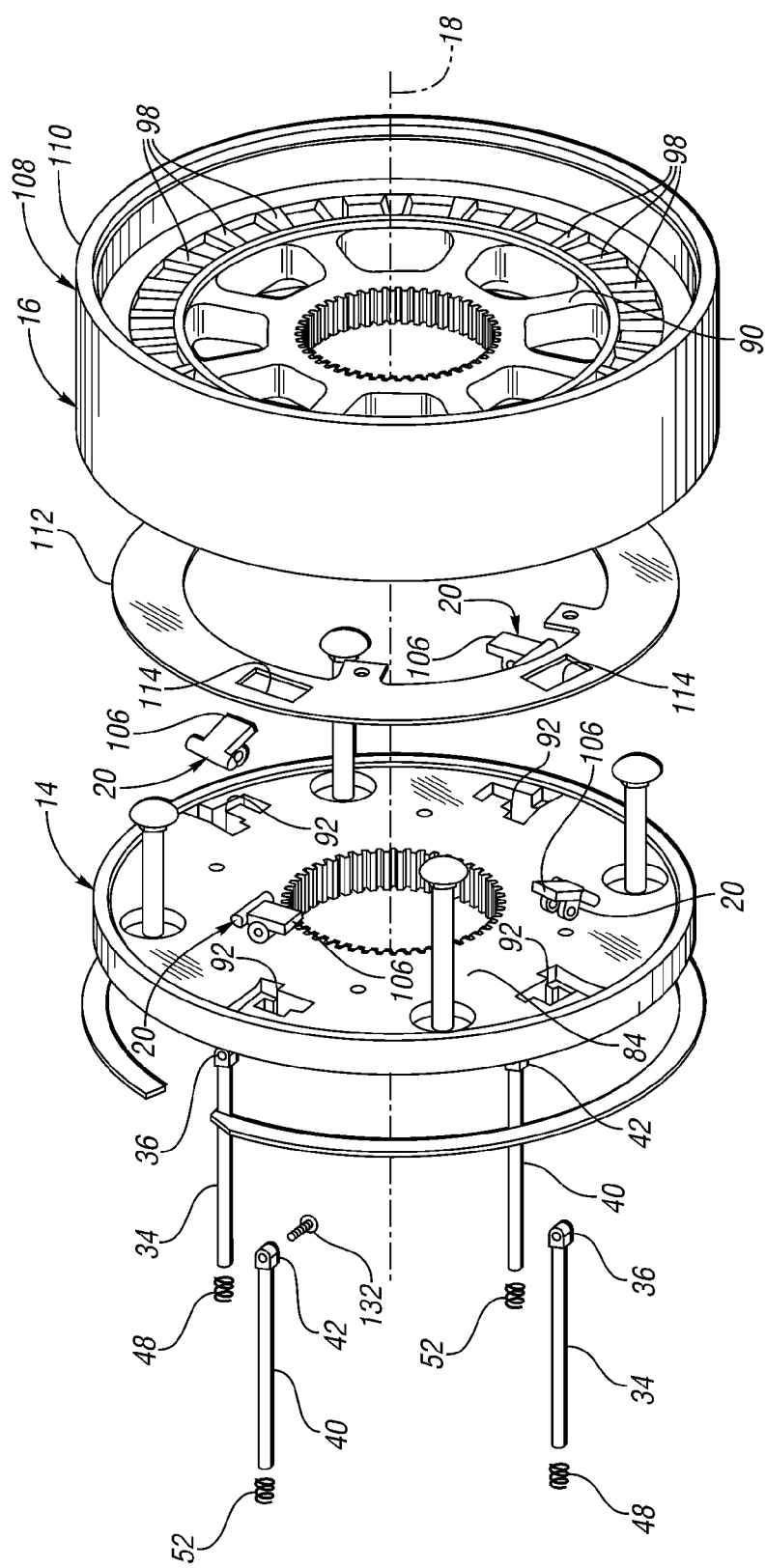
FIG. 5 is an exploded perspective view showing the first subassembly of the coupling assembly, first and second sets of rods of the electromechanical assembly and corresponding forward and reverse struts.
Figure 6:
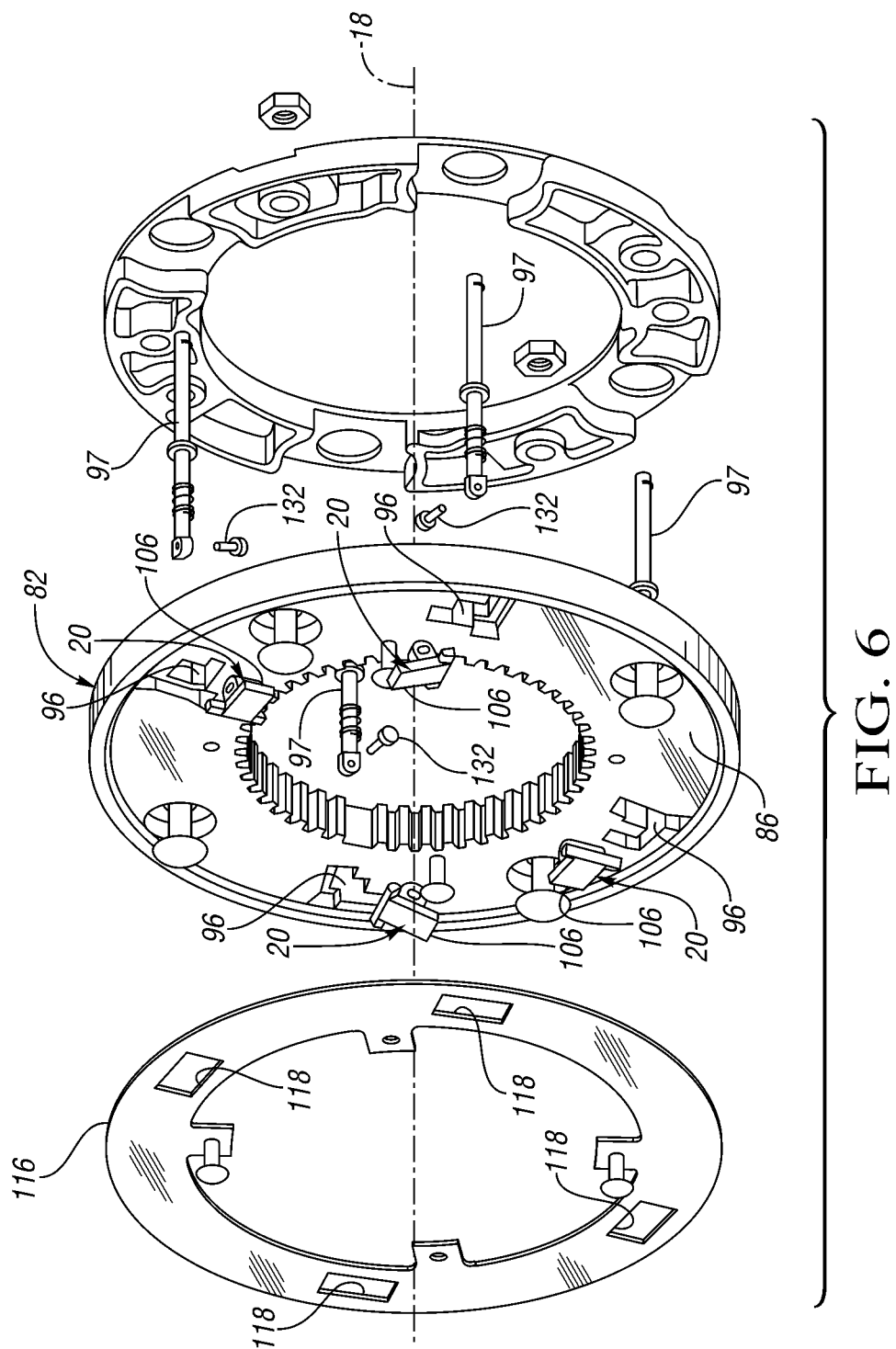
FIG. 6 is an exploded perspective view showing a second subassembly of the coupling assembly, third and fourth sets of rods of a second electromechanical assembly and corresponding forward and reverse struts.

Referring now to FIGS. 5 and 6, the coupling assembly or apparatus 12 comprises a controllable clutch assembly including first and second clutch subassemblies. The assembly 12 includes the drive or first clutch member 14, the driven or second clutch member 16 and a third or drive clutch member 82 all supported for rotation relative to one another about the common rotational axis 18. The first clutch member 14 has a coupling first face 84 oriented to face axially in a first direction along the rotational axis 18. The third clutch member 82 has a coupling third face 86 oriented to face axially in a second direction along the rotational axis 18. The second clutch member 16 has a coupling second face 88 opposed to the first face 84 and oriented to face axially in the second direction along the rotational axis 18. The second clutch member 16 also has a coupling fourth face 90 opposed to the third face 86 and oriented to face axially in the first direction along the rotational axis 18.

The first face 84 has a first set of pockets 92 spaced about the rotational axis 18. Each pocket 92 of the first set has a strut 20 of a first set of struts 20 received thereby.

The second face 88 has a first set of locking formations 94 that are engaged by the struts 20 upon projecting outwardly from the first set of pockets 92 to prevent relative rotation of the first and second clutch members 14 and 16 with respect to each other in at least one direction about the axis 18.

The third face 86 has a second set of pockets 96 spaced about the rotational axis 18. Each pocket 96 of the second set has a strut 20 of a second set of struts 20 received thereby. Each strut 20 contained within the second set of pockets 96 is connected or coupled to its respective rod 97 of a second electromechanical assembly substantially identical in structure and operation to the first electromechanical assembly. Consequently, other than the rods 97, the second electromechanical assembly is neither shown nor described.

The fourth face 90 has a second set of locking formations 98 that are engaged by the second set of struts 20 upon projecting outwardly from the second set of pockets 96 to prevent relative rotation of the second and third clutch members 16 and 82 with respect to each other in at least one direction about the axis 18. The first and second clutch members 14 and 16, respectively, form the first clutch subassembly and the second and third clutch members 16 and 82, respectively, form the second clutch subassembly.

The first clutch member 14 has a first set of passages 100 spaced about the rotational axis 18 and in communication with their respective pockets 92 of the first set of pockets 92 to communicate an actuating force (preferably by the rods 34 and 40) to their respective strut 20 within its respective pocket 92 so that its respective strut 20 moves into contact with the first set of locking formations 94 to couple the first and second clutch members 14 and 16, respectively, for rotation with each other in at least one direction about the axis 18.

The third clutch member 82 has a second set of passages (not shown) spaced about the rotational axis 18 and in communication with their respective pockets 96 of the second set of pockets 96 to communicate an actuating force (preferably by the driven rods 97 as previously described) to their respective strut 20 within its respective pockets 96 so that its respective strut 20 moves into contact with the second set of locking formations 98 to couple the second and third clutch members 16 and 82, respectively, for rotation with each other in at least one direction about the axis 18.

Each strut 20 of the first and second sets of struts 20 has an end 106 that is pivotally movable outwardly of its respective pocket 92 or 96.

The second clutch member 16 includes a housing 108 having an end wall 110 for housing the first and third clutch members 14 and 82, respectively.

Each of the subassemblies is independently controllable.

The first set of struts 20 includes at least one reverse strut 20 and at least one forward strut 20. A first element 112 is supported between the first and second clutch members 14 and 16, respectively. The first element 112 has at least one opening 114 extending completely therethrough to allow the forward and reverse struts 20 of the first set to extend therethrough and lock the first and second clutch members 14 and 16, respectively, together to prevent relative rotation between the first and second clutch members 14 and 16, respectively, in either direction about the axis 18.

The second set of struts 20 includes at least one reverse strut 20 and at least one forward strut 20. A second element 116 is supported between the second and third clutch members 16 and 82. The second element 116 has at least one opening 118 extending completely therethrough to allow the forward and reverse struts 20 of the second set to extend therethrough and lock the second and third clutch members 16 and 82, respectively, together to prevent relative rotation between the second and third clutch members 16 and 82, respectively, in either direction about the axis 18.

The first, second, third and fourth faces 84, 88, 86 and 90, respectively, are generally flat and face generally axially. The first, second, third and fourth faces 84, 88, 86 and 90, respectively, are generally annular and extend generally radially with respect to the rotational axis.

Figure 7:
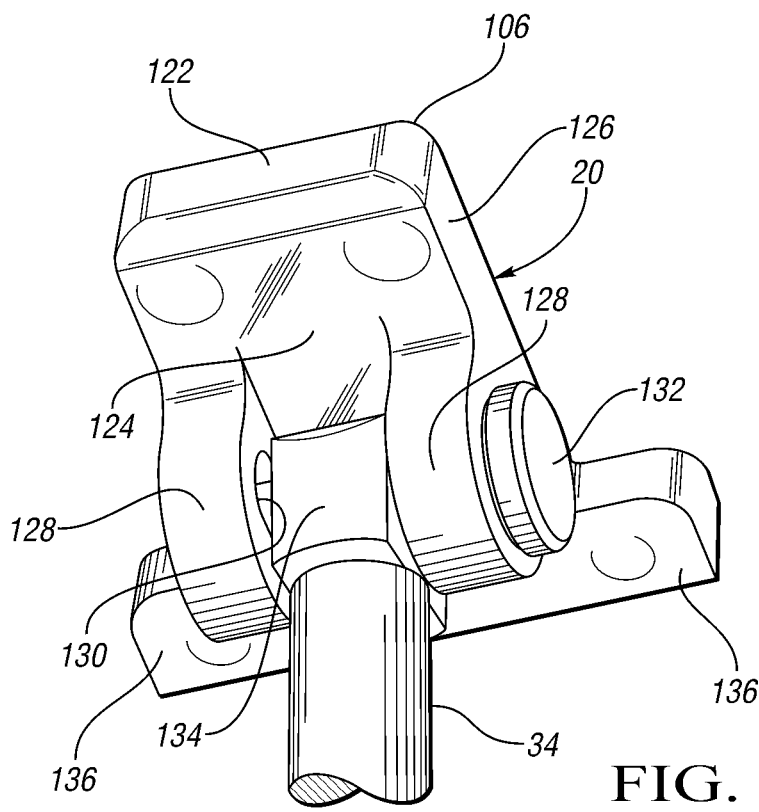
FIG. 7 is a bottom perspective view of a clevis-shaped strut (either forward or reverse) and interconnected rod, partially broken away.
Figure 8:
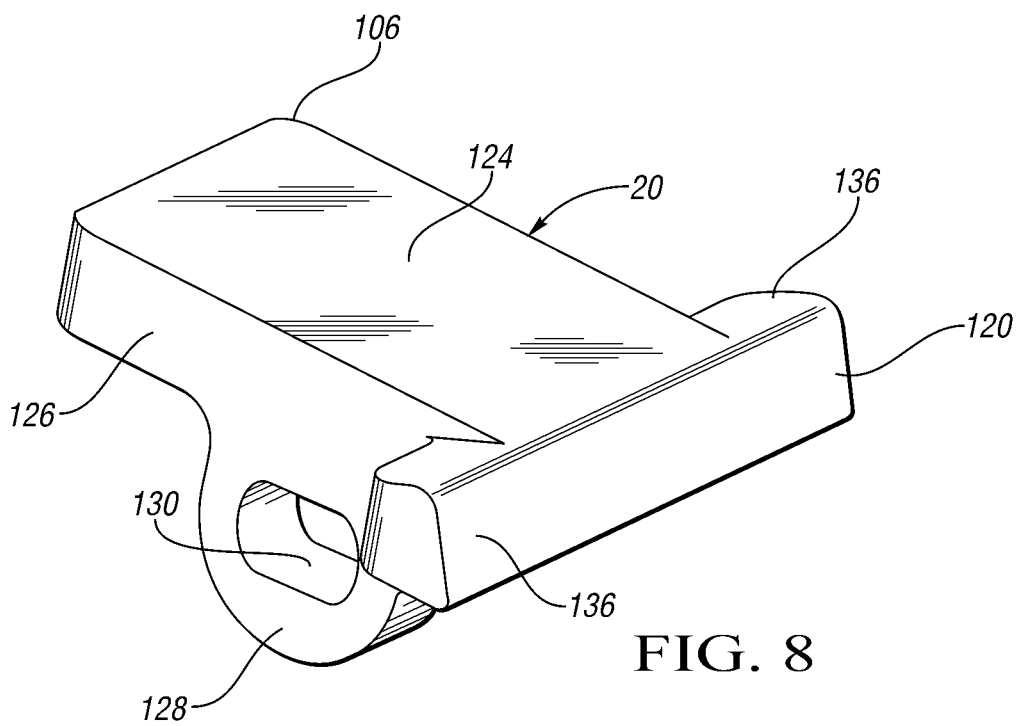
FIG. 8 is a top perspective view of the strut of FIG. 7.
Figure 9A:
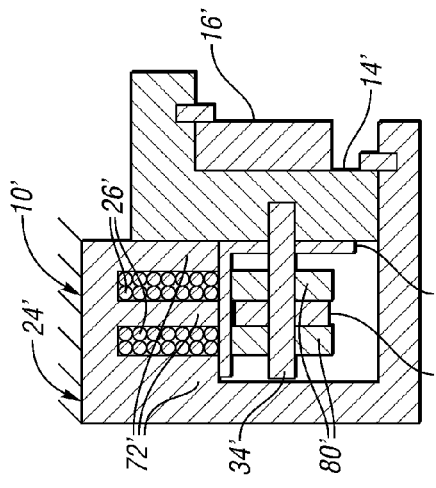
FIGS. 9A-9F are schematic diagrams illustrating various unitized dynamic linear motor concept of at least one embodiment of the present invention.
Figure 9B:
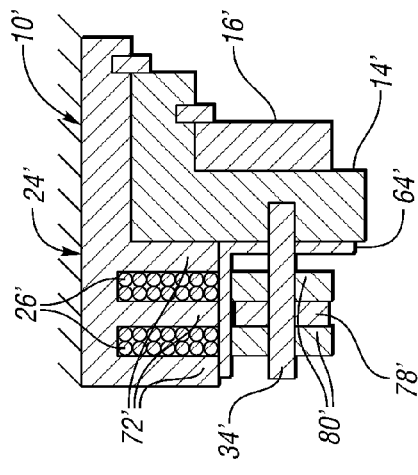
Figure 9C:
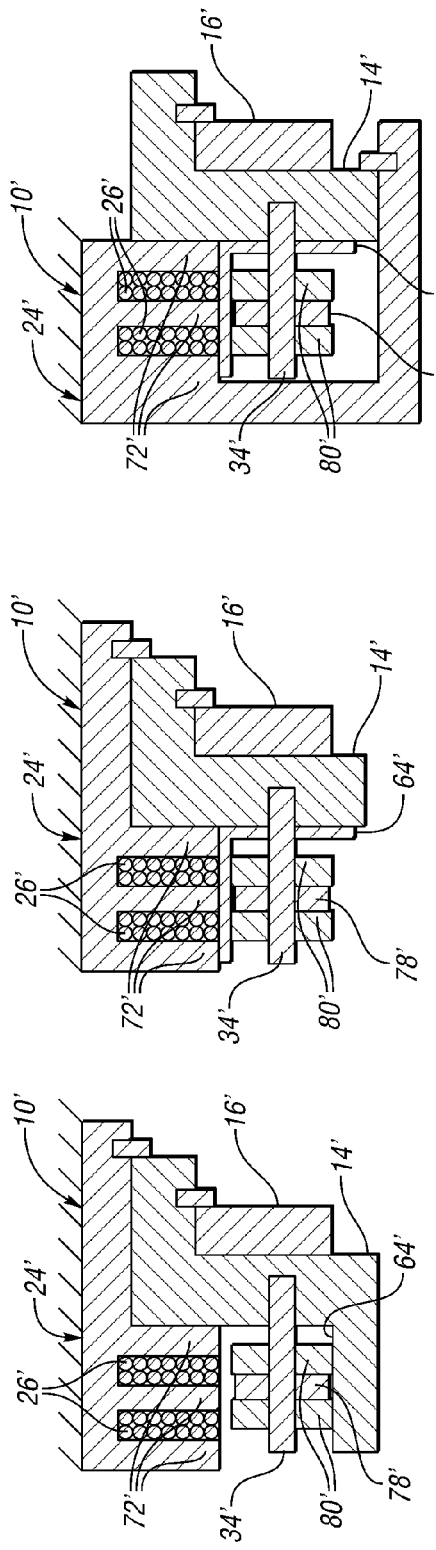
Figure 9D:
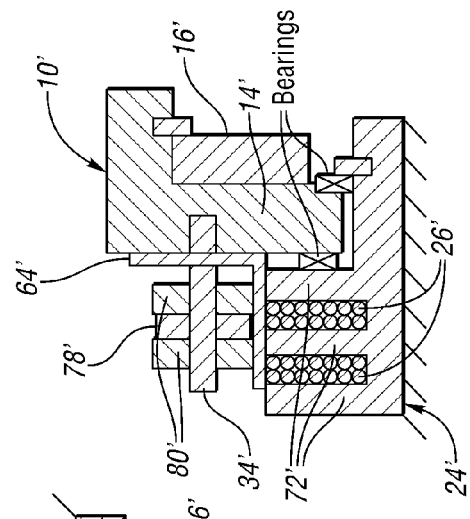
Figure 9E:
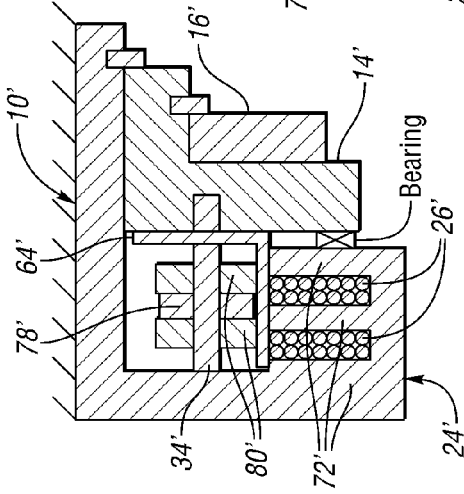
Figure 9F:
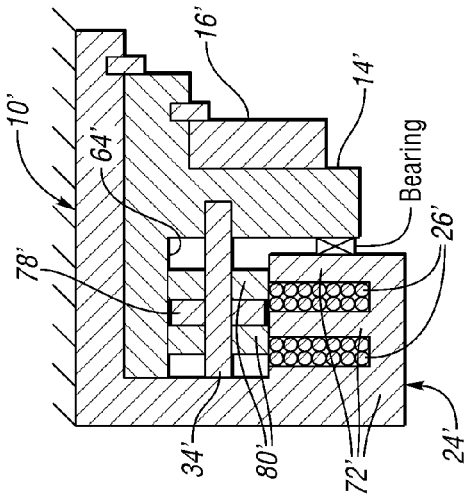

Referring now to FIGS. 7 and 8, there is illustrated one of the clevis-shaped struts 20 for the planar one-way clutch or apparatus 12. Each strut 20 comprises a member-engaging canted first end surface 120 and a member-engaging canted second end surface 122 diametrically opposite the first end surface 120. Each strut 20 also includes a main body portion 124 between the end surfaces 120 and 122. The main body portion includes a pair of spaced-apart side surfaces 126. Each strut 20 further includes a pair of spaced-apart, projecting leg portions 128. Each of the leg portions 128 extend from the main body portion 124 proximate one of the side surfaces 126. Each leg portion 128 has an aperture 130 adapted to receive a pivot pin 132 between the leg portions 128 to allow rotational movement of the strut 20 in responses to reciprocating movement of the rods 34, 40 or 97. A free end 134 of the rod 34, 40 or 97 is adapted to be coupled to the strut 20 via the pivot pin 132.

Each of the apertures 130 is preferably an oblong aperture 130 to receive the pivot pin 132 to allow both rotational and translational movement of the strut 20 in response to reciprocating movement of the rod 34, 40 or 97. Each strut 20 also includes a pair of oppositely projecting canted ears 136 which extend laterally from the main body portion 124 proximate the first end surface 120. Each strut 20 is preferably an injection molded strut such as a metal injection molded strut.

Referring now to FIGS. 9A-9F there are illustrated various unitized, dynamic linear motor concepts with one-way clutches and constructed in accordance with at least one embodiment of the present invention. In general, the clutches are magnetically latched. The clutches may be rocker, MD (mechanical diode), pawl, roller, sprag or any mechanical clutching device. The parts of FIGS. 1-8 which are the same or similar in structure and/or function to the parts shown in FIGS. 9C-9F have the same reference number but a single prime designation. Some parts are eliminated for simplicity.

In like fashion, FIGS. 10A-10C illustrate various unitized static linear motor concepts with one-way clutches constructed in accordance with at least one embodiment of the present invention. The parts of FIGS. 10A-10C which are the same or similar in structure or function to the parts of FIGS. 1-8 and 9A-9F have the same reference number but a double prime designation. Some parts are eliminated for simplicity.

Figure 11:
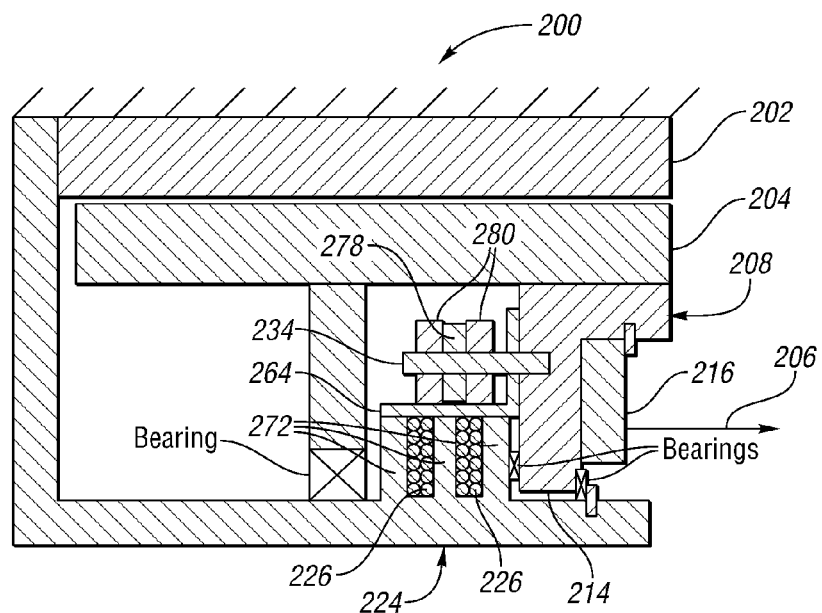
FIG. 11 is a schematic diagram illustrating an e-motor disconnect clutch constructed in accordance with at least one embodiment of the present invention.

FIG. 11 illustrates an electric motor disconnect clutch assembly, generally indicated at 200. The assembly 200 includes a motor stator 202, a motor rotor 204, a rotary output shaft 206 and an overrunning coupling and control subassembly, generally indicated at 208, and constructed generally in accordance with the previously described overrunning coupling and control assemblies. Consequently, parts of the subassembly 208 which are the same or similar in structure and/or function to the parts shown in the prior Figures have the same reference number but are prefaced by the number "2." In other words "200" has been added to the prior reference number.

Figure 12:
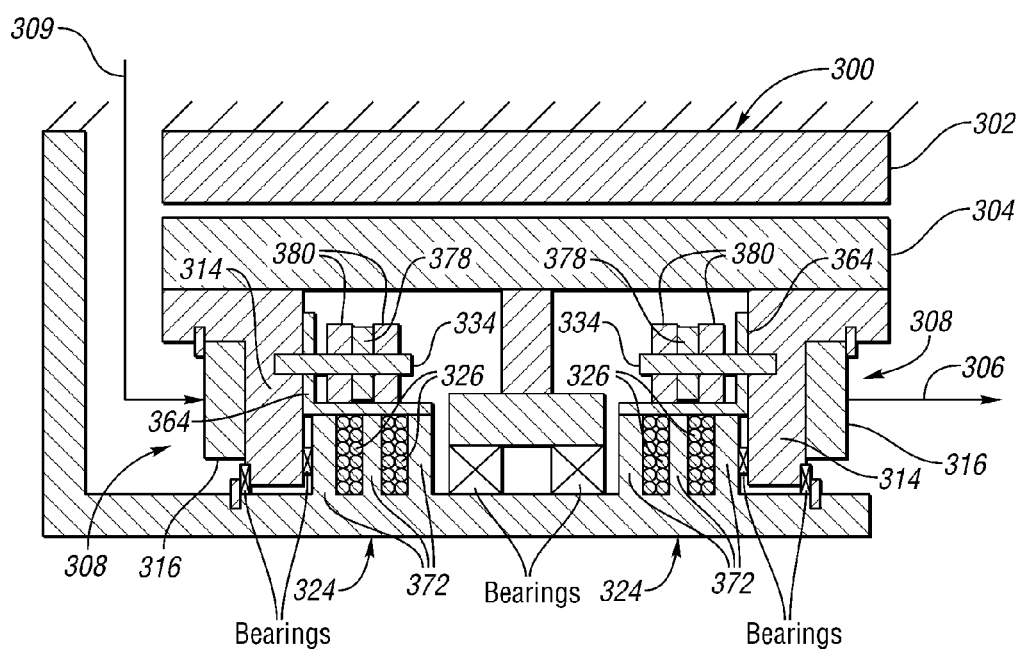
FIG. 12 is a schematic diagram illustrating an e-motor disconnect/pass through clutch assembly.

FIG. 12 illustrates an electric motor disconnect/pass through assembly, generally indicated at 300, somewhat similar to the assembly 200 of FIG. 11 but also including a rotary input shaft 309 and a pair of previously described overrunning and control assemblies, generally indicated at 308. The assembly 300 also includes a motor stator 302, a motor rotor 304 and a rotary output shaft 306. Parts of each subassembly 308 which are the same or similar in structure and/or function to the parts shown in prior FIGS. 1-10 have the same reference number but are prefaced by the number "3." In other words "300" has been added to the prior reference number.

Axial Translation Latching Force in the Permanent Magnet (PM) Linear Motor

Figure 13:
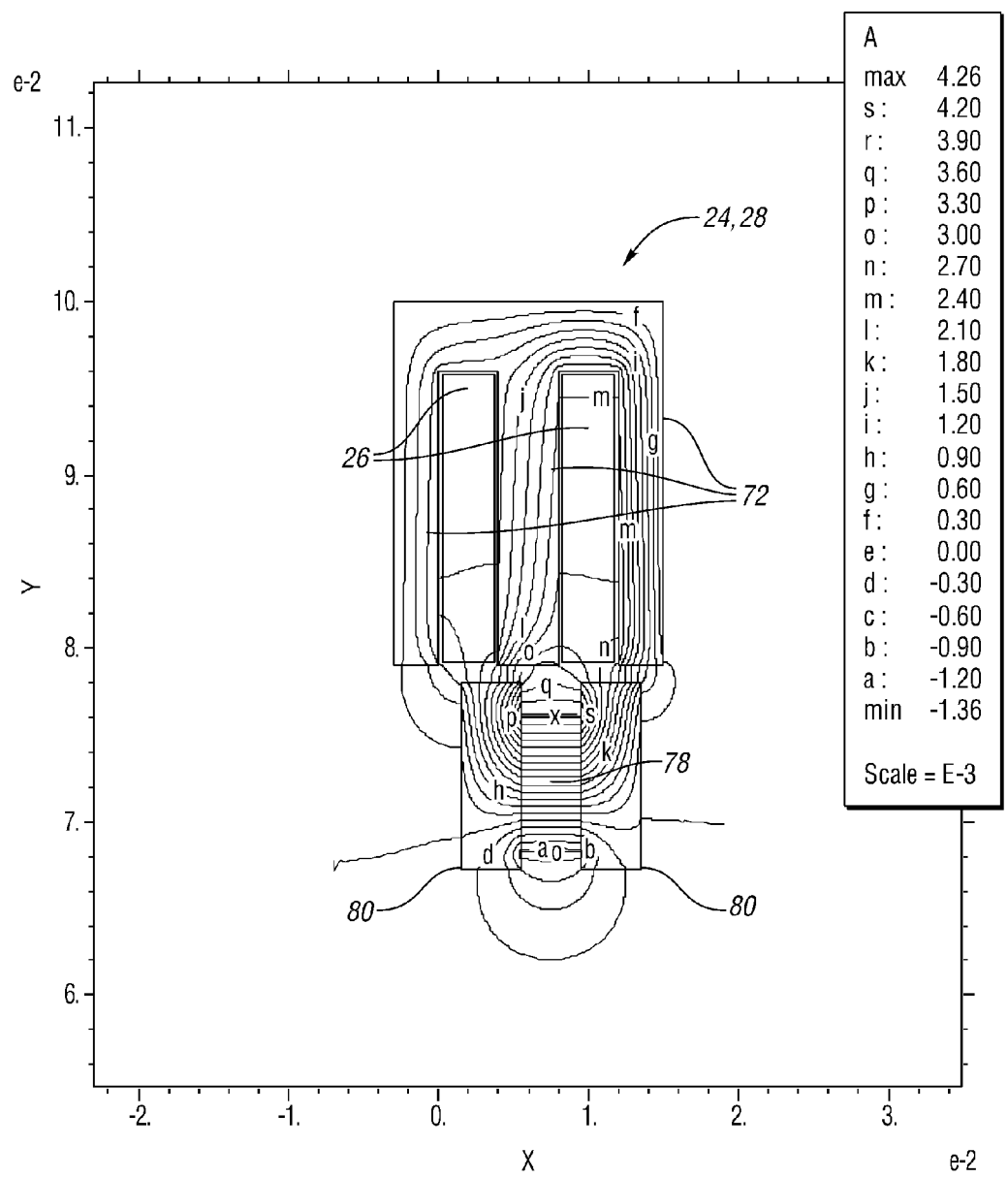
FIG. 13 is a graph of radial distance versus axial distance and showing magnetic field lines due to a permanent magnet of a linear motor superimposed on the graph.

Consider the magnetic field line plot, also referred to as a magnetic flux line plot, shown in the cross sectional view of the subject linear motor structure, in FIG. 13. This is a circularly symmetric machine structure, with the translator axial movement direction shown in the x-direction, and the radial direction shown in the y-direction. The stator 24,28 cross section is a three iron tooth 72, two slot/coil 26 structure with the slot openings facing, across a radial air gap, the moving element or translator. The translator structure includes a single, axially-magnetized, rare earth PM ring 78 sandwiched between two iron field redirection rings 80. The sizing of the various components can be estimated from the scaling, given in meters, on the x and y axes. The magnetic field lines have been determined by a commercial magnetic finite element analysis (MFEA) software package. The solution shown in FIG. 13 is for the case of no coil current in the stator windings, and a translator axial position somewhat past, to the right of, the "neutral" or center position. The magnetic field lines, due to the translator magnet ring 78 alone, are seen to "flow" in closed paths with the majority of the lines flowing in a stator iron—air gap—translator iron/magnet circular path.

Figure 14A:
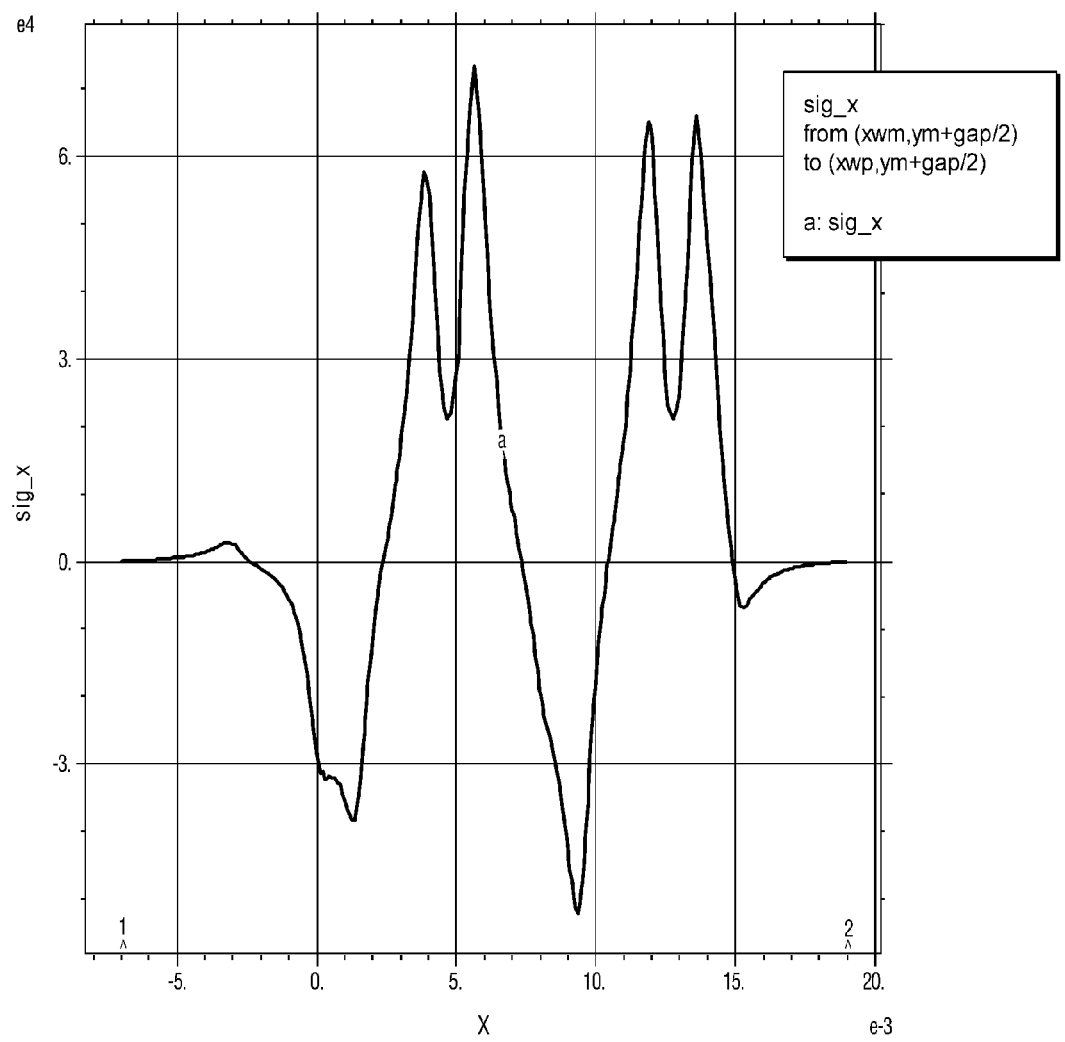
FIG. 14A is a graph of sheer force density versus axial distance and showing sheer stress at a mid-air gap due to the permanent magnet.
Figure 14B:
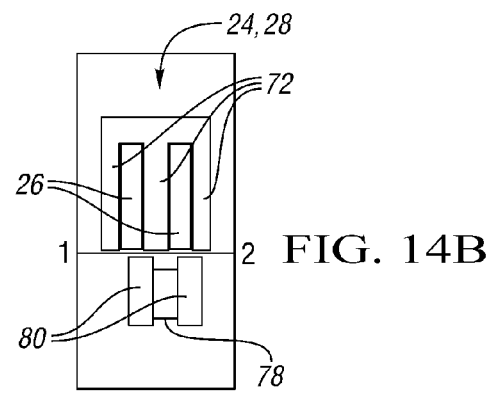
FIG. 14B is a schematic diagram of the magnetic sources of the linear motor.

In general, the lines of force are confined to paths with a majority of iron content due to the ease of field production within the iron material. Examining the field lines that cross the air gap between the stator and the translator, a majority of them follow a path, from the translator iron redirection rings, up and to the right, to the iron teeth members in the stator. Thinking of the field lines as stretched rubber bands one would then expect a net force pulling the entire translator to the right. The actual sheer force density or x-directed sheer stress, again determined from MFEA analysis, at the axial directed mid air gap line for this case is given in FIG. 14A. Shearing stress to both the right and the left is seen in FIG. 14A, which can be matched to the distribution of air gap field lines which "lean" to both the right and left along the air gap, but the total force (the integrated shear over the air gap x-directed extent) shows a net force on the translator to the right, for this particular translator position.

Figure 15A:
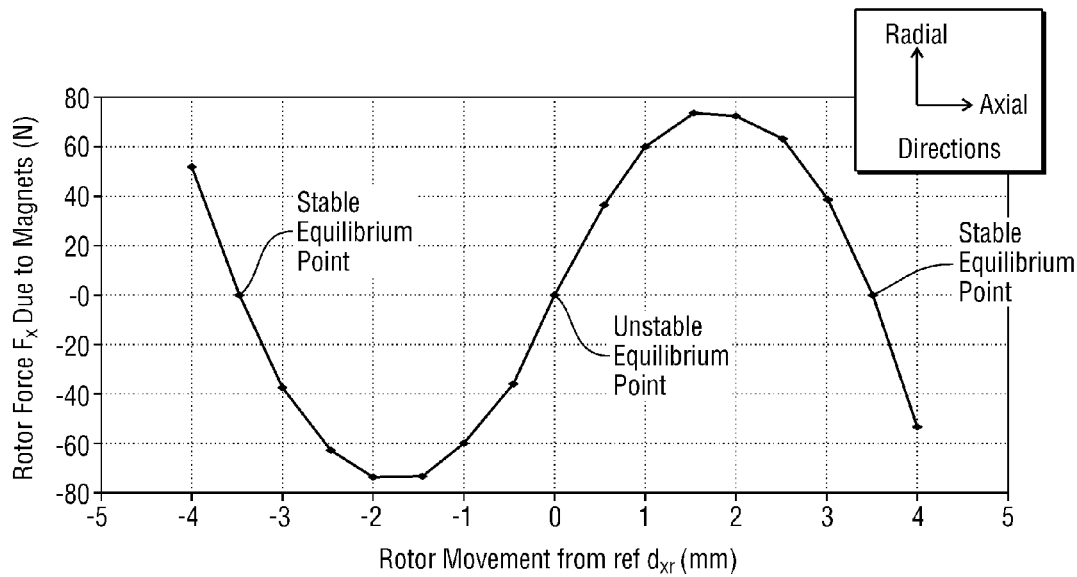
FIG. 15A is a graph of rotor or translator force (i.e. latching force) due to the permanent magnet versus rotor or actuator position.
Figure 15B:
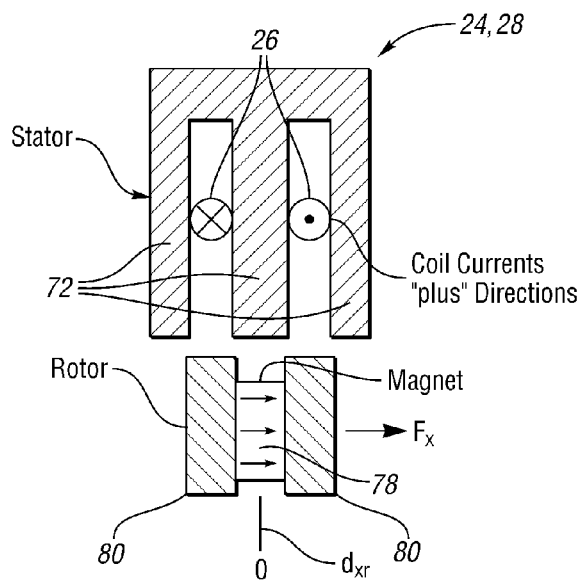
FIG. 15B is a schematic sectional view of the stator and the rotor of the linear motor.

If one "sweeps" the translator position from left to right and recalculates the field lines at each position one can obtain a "slide show" of the magnetic field line production due to the translator magnet ring as a function of translator position. When the translator structure is located to the left of the center or neutral position, the majority of the flux lines flow radially up and to the left of the translator position, so we expect a left directed force on the translator body. Conversely, as also shown in FIG. 13, when the translator structure is located to the right of the center position, the majority of flux line flow is radially up and to the right, so a right directed force on the translator body is expected. A plot of the actual total axial force on the translator body as a function of axial position, given in Newtons, is shown in FIG. 15A. If the translator is positioned to the right of center, it is pushed, due to its own magnetic field, to the right, and if positioned to the left of center, it is pushed further to the left. This is referred to as the "latching" action of the assembly. The exact center position, where the left-right pushing force exactly balances to zero, is an unstable equilibrium point, at which even minute movements will result in forces tending to push the translator away from the center position. The two other points shown, near the two axial ends of the stator structure, where the net translational force also passes through a zero value, are stable equilibrium points, where minute movements result in position restoring force production.

Figure 16:
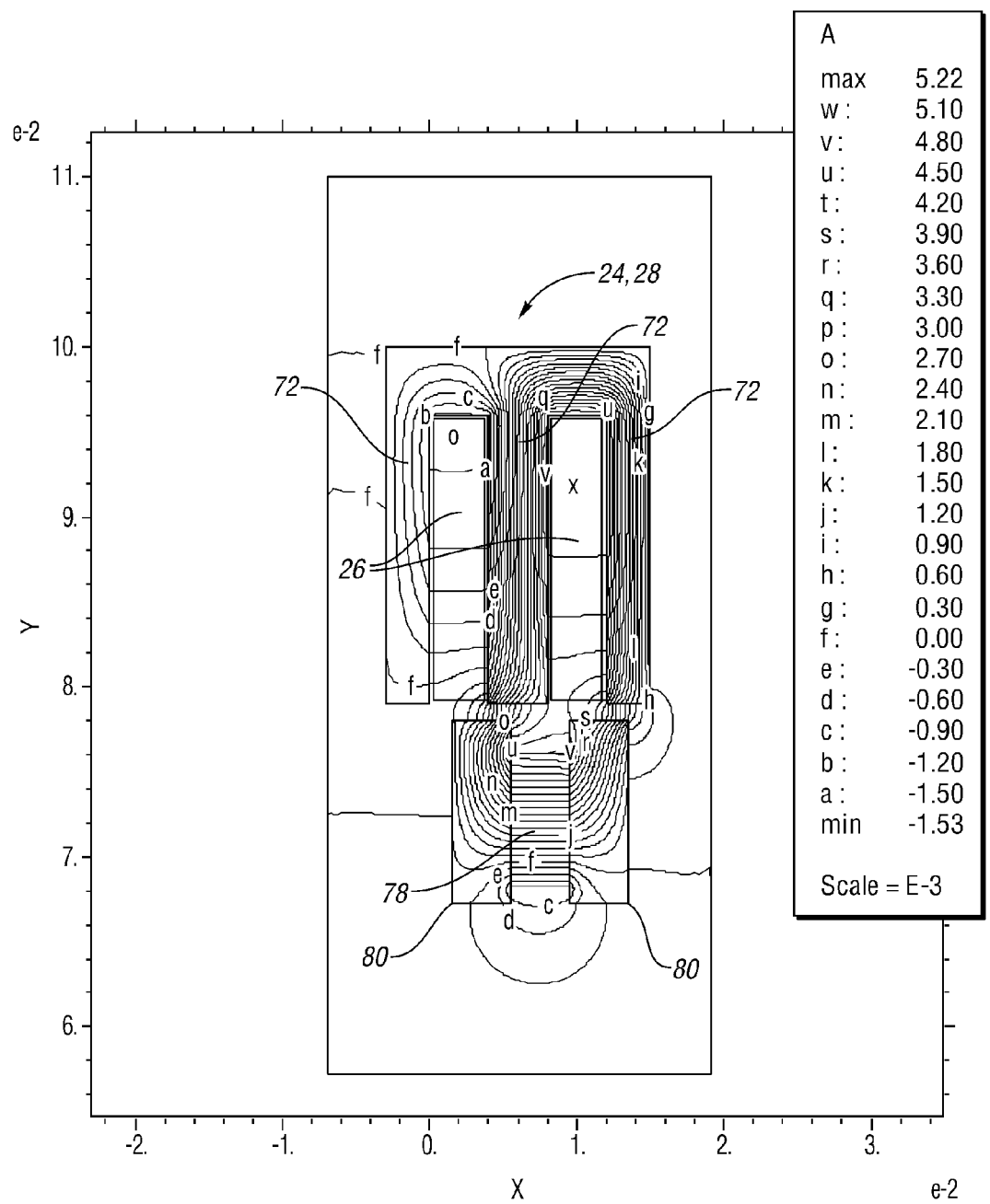
FIG. 16 is a graph similar to the graph of FIG. 13 due to both the permanent magnet and coil currents in the electromagnetic source.

Axial Translation Force in the Permanent Magnet Linear Motor for the Case of Coil Current Consider the same machine structure as given in FIG. 13 but with the addition of steady electrical current in the two stator windings. The solution for the magnetic field lines for this situation is shown in FIG. 16. A steady current, assumed uniformly distributed in the winding cross sections, is assumed to flow out of the page, toward the viewer in the wires of the coil in the slot on right side of the stator. The axial magnetization direction of the ring magnet did not matter in the pure latching force situation of FIG. 13 but it matters very much in this case of "dual" magnetic excitation. For the case shown, the magnet axial magnetization is stipulated to be to the right, in the plus x-direction, and therefore the direction or polarity of the magnetic lines of force closed "flow" path, due to the magnet alone, would be a counter clockwise circulation. The polarity direction of the circulating magnetic lines of force due to an electric current is given by the "right hand rule." If the thumb of one's right hand is made to point in the direction of the current flow in a wire, or a coil of wires, with the fingers encircling the cross section of the wire or the coil, the magnetic field lines or flux lines also encircle the wire or coil cross section and have a circulating direction in the same direction as the curling fingers.

In FIG. 16 the magnetic lines due the current in the left side coil alone then encircle this coil in the counter clockwise direction, while the magnetic lines due to the current in the right side coil encircle this coil in the clockwise direction. The net or total production of magnetic field lines, as shown in FIG. 16 is due to all three magnetic sources, the current in both coils and the translator magnet, so obviously there are regions in the machine structure where the individual sources of magnetic excitation enforce and add with each other and there are regions in the machine structure where the individual sources of magnetic excitation buck or subtract from each other. Since the coil current is reversible (plus or minus) the dual source enforcement and bucking regions within the machine structure, and, most importantly, within the machine air gap, can be moved with respect to each other. This is the basis of the controllable/reversible direction linear motor disclosed herein.

Figure 17A:
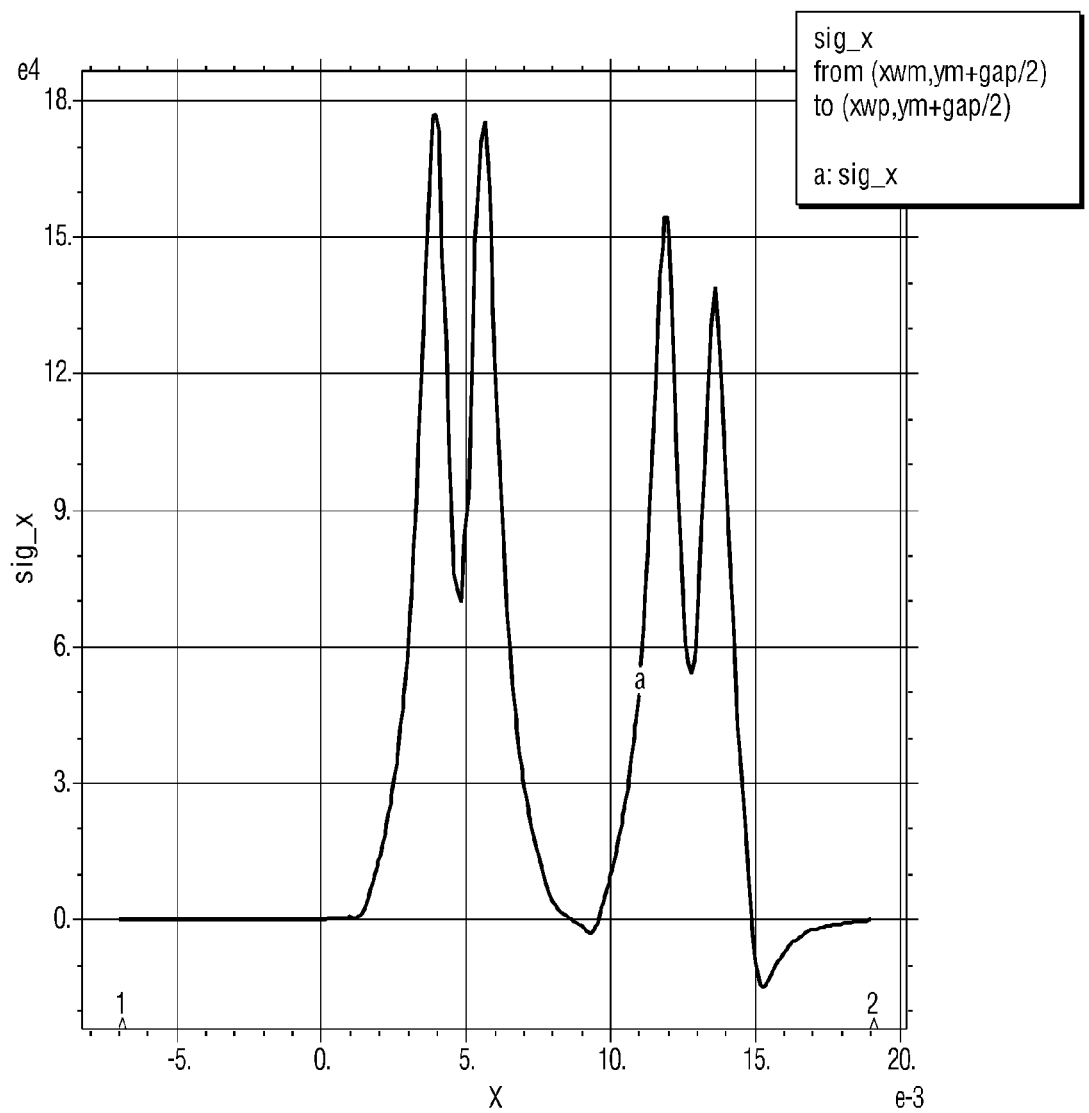
FIG. 17A is a graph similar to the graph of FIG. 14A due to both the permanent magnet and coil currents.
Figure 17B:
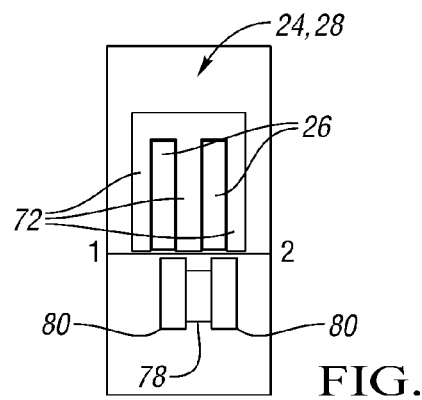
FIG. 17B is a schematic view similar to the schematic view of FIG. 14B.

The flow of the majority of the flux lines produced by the translator magnet alone resulted in a net force on the translator to the right for the given translator position shown in FIG. 13. But for the same translator position, with the addition of the coil currents, for the case shown in FIG. 16, the flow of the majority of the flux lines has shifted to a net encirclement of the left hand coil and the translator structure. So the majority of the flux lines now cross the air gap up and to the left with respect to the case confirms this and is shown in the plot of FIG. 17A. If the translator, by means of a "stop" was, previous to the introduction to translator magnet, introduction of coil current as in FIG. 16 would then overpower the latching force to the right and produce a net motoring force to the left, inducing the translator into left-directed motion. If the translator does move and subsequently crosses over the center or neutral position, the motoring or switching current can even then be removed, as the now left-directed latching force, due to the magnet alone, will enforce the remaining left movement to a similar off-state latching position to the left of the center or neutral position. The net axial separation between the two latched positions on the left and right of the center position is then said to be the "stroke" length of the machine.

A slide show set of solutions for the total magnetic field lines within the linear motor structure with the same coil current drive as in the case shown in FIG. 16, as a function of the axial position of the translator, similar to that given for the previous case of magnet excitation alone, show that for the level of coil current assumed the net force on the translator structure is always to the left, no matter the assumed value of the translator position.

Figure 18:
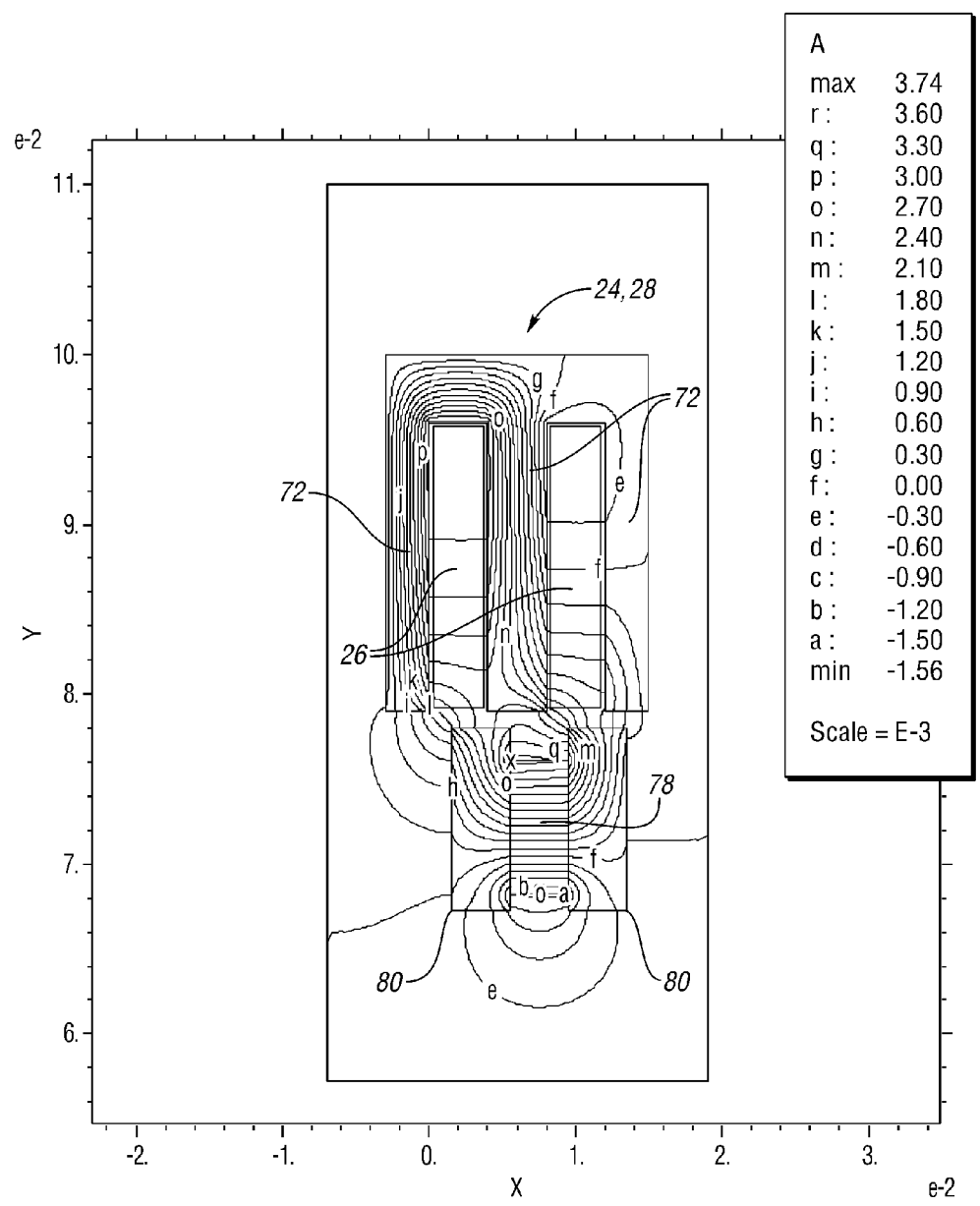
FIG. 18 is a graph similar to the graph of FIG. 16 but with reversed coil currents.
Figure 19A:
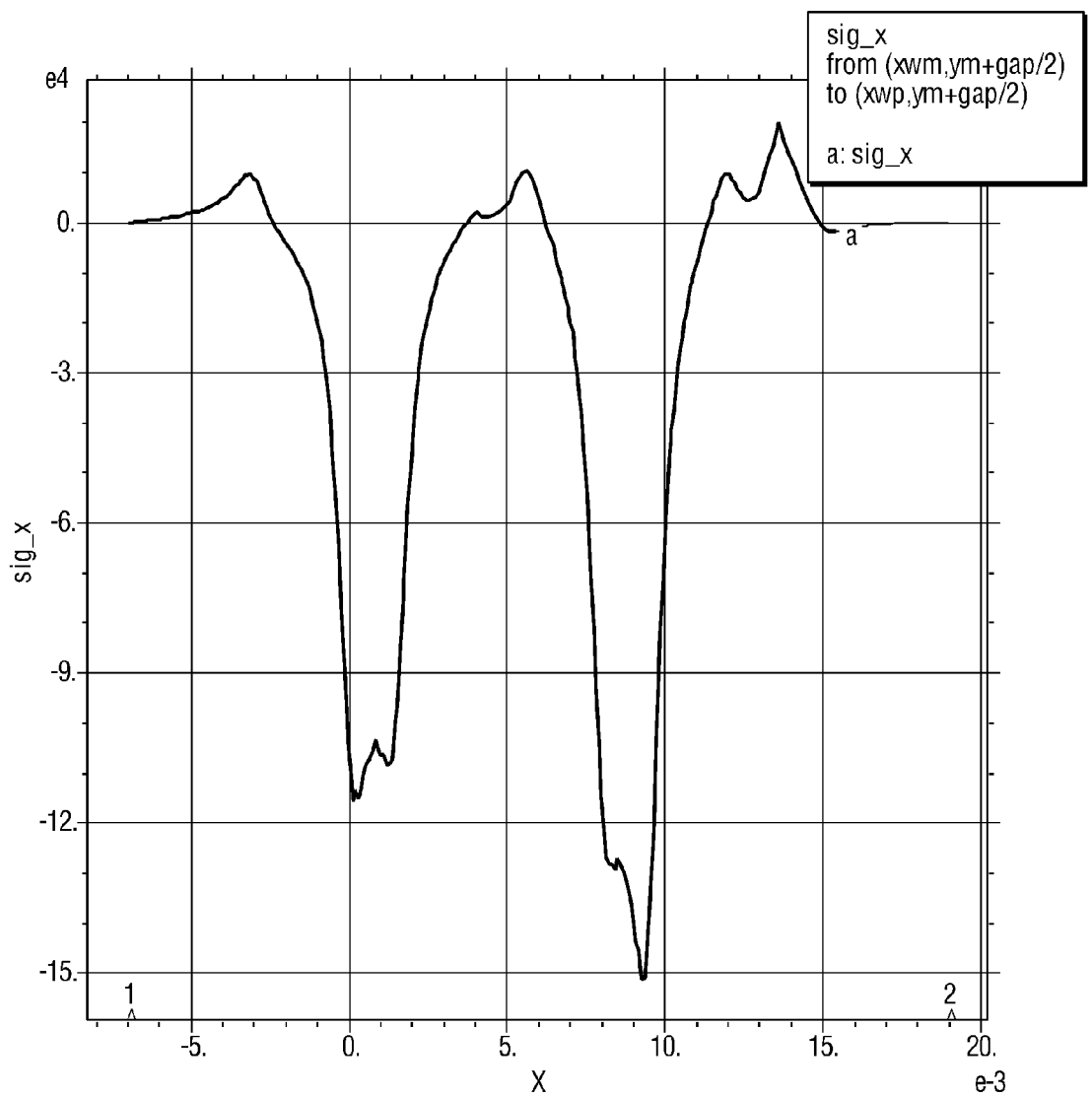
FIG. 19A is a graph similar to the graph of FIG. 17A with the reversed coil currents.
Figure 19B:
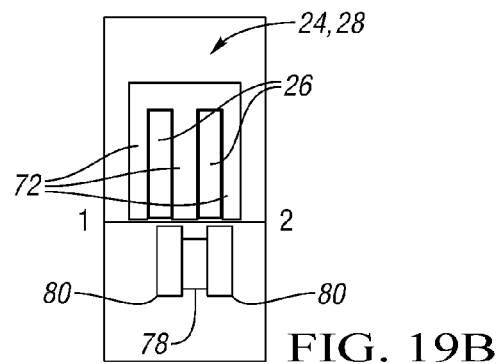
FIG. 19B is a view similar to the view of FIGS. 14B and 17B.

Finally, the magnetic field and axial sheer stress solutions for the case of coil current aiding drive, that is drive in the direction of the magnet latching force, are given in FIGS. 18 and 19A, respectively. The polarity of the coil currents for the case of FIGS. 18 and 19A are simply reversed from that of the case shown in FIGS. 16 and 17A, the translator position is the same as in the case of FIGS. 16 and 17A. In this case, coil current drives in the direction of the magnet latching force, when the translator position has moved to the left of the center position.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A switchable linear actuator device to control the operating mode of a coupling assembly having a locking member, the device having a plurality of magnetic sources which produce corresponding magnetic fields to create a net translational force, the device comprising:
    a stator structure including at least one electromagnetic source; and
    a translator structure including a connecting rod having a free end connected to the locking member to actuate the locking member for selective, small-displacement, locking member movement, the translator structure further including a permanent magnet source operatively connected to the connecting rod and magnetically coupled to the stator structure across a radial air gap and supported for translational movement relative to the stator structure along an axis between first and second stable axial end positions which correspond to first and second operating modes of the coupling assembly and an unstable axial equilibrium position between the end positions, the translator structure translating along the axis between the different positions upon experiencing the net translational force comprising a first translational force caused by energization of the at least one electromagnetic source and a latching force based upon linear position of the permanent magnet source along the axis.

2. The device as claimed in claim 1, wherein the structures are substantially circularly symmetric.

3. The device as claimed in claim 2, wherein each electromagnetic source includes an annular slot and a coil disposed in the slot, each slot opening to the radial air gap.

4. The device as claimed in claim 1, wherein the permanent magnet source comprises an annular magnet.

5. The device as claimed in claim 4, wherein the annular magnet is a rare earth magnet.

6. The device as claimed in claim 4, wherein the annular magnet is axially magnetized.

7. The device as claimed in claim 4, wherein the translator structure includes a pair of field redirection rings and wherein the annular magnet is sandwiched between the field redirection rings.

8. A reciprocating electromechanical apparatus for controlling the operating mode of a coupling assembly having a locking element, the apparatus comprising:
    first and second members including first and second faces, respectively, in close-spaced opposition with one another, the second member being mounted for rotation about an axis and for reciprocating movement along the axis;
    magnetic circuit components including first and second magnetic sources, the first magnetic source being supported by the first member at the first face in close-spaced opposition to the second magnetic source which is supported by the second member, the magnetic sources being separated by a radial air gap, wherein the second magnetic source is a permanent magnetic source having a permanent magnetic field and the first magnetic source is an electromagnetic source including a coil; and
    a connecting rod extending from the second member, the rod having a free end connected to the locking element to connect the second member to the locking element of the coupling assembly to transfer the reciprocating movement to the locking element, wherein coil energization creates a temporary magnetic field which causes the second member and the connecting rod to reciprocate between extended and retracted positions along the axis and wherein the permanent magnetic field causes the second member and the connecting rod to maintain at least one of the positions without the need to maintain coil energization thereby providing a latching effect.

9. The apparatus as claimed in claim 8, wherein the first face has at least one recess in which the coil is located.

10. The apparatus as claimed in claim 9, wherein the at least one recess includes an annular recess.

11. The apparatus as claimed in claim 8, wherein the permanent magnet source is an annular magnet.

12. An overrunning coupling and control assembly comprising:
    first and second coupling members supported for rotation relative to one another about a common rotational axis, and at least one locking member for selectively mechanically coupling the members together to prevent relative rotation of the first and second coupling members with respect to each other in at least one direction about the axis;
    a stator subassembly including at least one coil to create a magnetic flux when the at least one coil is energized; and
    a magnetically-latching actuator subassembly including at least one bi-directionally movable rod, each rod having a free end connected to its respective locking member to actuate its locking member for selective, small-displacement locking member movement, the actuator subassembly further including a magnetic actuator coupled to each rod and mounted for controlled reciprocating movement along the rotational axis relative to the first coupling member between an extended position which corresponds to a first mode of the assembly and a retracted position which corresponds to a second mode of the assembly, each rod actuating its respective locking member in the extended position so that each locking member couples the first and second coupling members for rotation with each other in at least one direction about the rotational axis, the magnetic actuator completing a path of the magnetic flux to magnetically latch in at least one of the positions, wherein a control force caused by the magnetic flux is applied to linearly move the magnetic actuator between the retracted and extended positions along the rotational axis.

13. The assembly as claimed in claim 12, wherein the magnetic actuator includes a permanent magnet source.

14. The assembly as claimed in claim 12, further comprising a guide member to guide the reciprocating movement.

15. The assembly as claimed in claim 14, wherein the guide member includes a support portion to support the actuator subassembly adjacent the stator subassembly.

16. The assembly as claimed in claim 12, wherein each of the rods is plunger-shaped.

17. The assembly as claimed in claim 12, further comprising at least one bearing for rotatably supporting the first coupling member on the stator subassembly.

18. The assembly as claimed in claim 12, wherein the first coupling member and the stator subassembly form a unitary structure and wherein a radial air gap separates the unitary structure from the actuator subassembly.

19. The assembly as claimed in claim 12, wherein each locking member is a locking strut.

20. The assembly as claimed in claim 12, wherein a portion of the first coupling member supports the actuator subassembly adjacent the stator subassembly.

21. The assembly as claimed in claim 12, wherein the first coupling member is a pocket plate.

22. An overrunning clutch and control assembly comprising:
   first and second clutch members supported for rotation relative to one another about a common rotational axis, and at least one locking strut for selectively mechanically coupling the members together to prevent relative rotation of the first and second clutch members with respect to each other in at least one direction about the axis;
   a stator subassembly including at least one coil to create a magnetic flux when the at least one coil is energized; and
   a magnetically-latching actuator subassembly including at least one bi-directionally movable rod, each rod having a free end connected to its respective locking strut to actuate its locking strut for selective, small displacement strut movement, the actuator subassembly further including a magnetic actuator device coupled to each rod and mounted for controlled reciprocating movement along the rotational axis relative to the first clutch member between an extended position which corresponds to a first mode of the assembly and a retracted position which corresponds to a second mode of the assembly, each rod actuating its respective locking strut so that each locking strut couples the first and second clutch members for rotation with each other in at least one direction about the rotational axis, the magnetic actuator device completing a path of the magnetic flux to magnetically latch in at least one of the positions, wherein a control force caused by the magnetic flux is applied to linearly move the magnetic actuator device between the retracted and extended positions along the rotational axis.

23. The assembly as claimed in claim 22, wherein the magnetic actuator device includes a permanent magnet source.

24. The assembly as claimed in claim 22, further comprising a guide member to guide the reciprocating movement.

25. The assembly as claimed in claim 22, wherein each of the rods is plunger-shaped.

26. The assembly as claimed in claim 25, wherein the guide member includes a support portion to support the actuator subassembly adjacent the stator subassembly.

27. The assembly as claimed in claim 22, further comprising at least one bearing for rotatably supporting the first clutch member on the stator subassembly.

28. The assembly as claimed in claim 22, wherein the first clutch member and the stator subassembly form a unitary structure and wherein a radial air gap separates the unitary structure from the actuator subassembly.

29. The assembly as claimed in claim 22, wherein a portion of the first clutch member supports the actuator subassembly adjacent the stator subassembly.

30. The assembly as claimed in claim 22, wherein the first clutch member is a pocket plate.

31. The assembly as claimed in claim 22, wherein the clutch is a dynamic clutch.

32. The assembly as claimed in claim 22, wherein the clutch is a static clutch.

33. An electric motor disconnect assembly comprising:
   a motor stator;
   a motor rotor;
   a rotary output shaft; and
   an overrunning coupling and control subassembly including:
   first and second coupling members supported for rotation relative to one another about a common rotational axis, and at least one locking member for selectively mechanically coupling the members together to prevent relative rotation of the first and second coupling members with respect to each other in at least one direction about the axis; the second coupling member being coupled to the rotary output shaft;
   a stator subassembly including at least one coil to create a magnetic flux when the at least one coil is energized; and
   a magnetically-latching actuator subassembly including at least one bi-directionally movable rod, each rod having a free end connected to its respective locking member to actuate its locking member for selective, small displacement locking member movement, the actuator subassembly also including a magnetic actuator device coupled to each rod and mounted for controlled shifting movement along the rotational axis relative to the first coupling member between an extended position which corresponds to a first mode of the assembly and a retracted position which corresponds to a second mode of the assembly, each rod actuating its respective locking member in the extended position so that each locking member couples the first and second coupling members for rotation with each other in at least one direction about the rotational axis, the magnetic actuator device completing a path of the magnetic flux to magnetically latch in at least one of the positions, wherein a control force caused by the magnetic flux is applied to linearly move the magnetic actuator device between the retracted and extended positions along the rotational axis.

34. An electric motor disconnect and pass through assembly comprising:
   a motor stator;
   a motor rotor;
   a rotary input shaft;
   a rotary output shaft; and
   a pair of overrunning coupling and control subassemblies, each of the subassemblies including:
   first and second coupling members supported for rotation relative to one another about a common rotational axis, and at least one locking member for selectively mechanically coupling the members together to prevent relative rotation of the first and second coupling members with respect to each other in at least one direction about the axis;

a stator subassembly including at least one coil to create a magnetic flux when the at least one coil is energized; and a magnetically-latching actuator subassembly including at least one bi-directionally movable rod, each rod having a free end connected to its respective locking member to actuate its locking member for selective, small displacement locking member movement, the actuator subassembly further including a magnetic actuator device coupled to each rod and mounted for controlled shifting movement along the rotational axis relative to the first coupling member between an extended position which corresponds to a first mode of the assembly and a retracted position which corresponds to a second mode of the assembly, each rod actuating its respective locking member in an extended position so that each locking member couples the first and second coupling members for rotation with each other in at least one direction about the rotational axis, the magnetic actuator device completing a path of the magnetic flux to magnetically latch in at least one of the positions, wherein a control force caused by the magnetic flux is applied to linearly move the magnetic actuator device between the retracted and extended positions along the rotational axis; wherein one of the second coupling members is coupled to the rotary input shaft and the other of the second coupling members is coupled to the rotary output shaft.

* * * * *